US012154310B2

(12) United States Patent
Garg et al.

(10) Patent No.: US 12,154,310 B2
(45) Date of Patent: Nov. 26, 2024

(54) TECHNOLOGIES FOR AUTOMATICALLY DETERMINING AND DISPLAYING SALIENT PORTIONS OF IMAGES

(71) Applicants: Anshul Garg, Bangalore (IN); Vikramaditya Khemka, Belmont, MA (US); Ajay Joshi, Bedford, MA (US)

(72) Inventors: Anshul Garg, Bangalore (IN); Vikramaditya Khemka, Belmont, MA (US); Ajay Joshi, Bedford, MA (US)

(73) Assignee: CIMPRESS SCHWEIZ GMBH, Winterthur (CH)

( * ) Notice: Subject to any disclaimer, the term of this patent is extended or adjusted under 35 U.S.C. 154(b) by 375 days.

(21) Appl. No.: 17/333,508

(22) Filed: May 28, 2021

(65) Prior Publication Data

US 2022/0383032 A1 Dec. 1, 2022

(51) Int. Cl.
*G06V 10/46* (2022.01)
*G06F 18/214* (2023.01)
*G06T 11/60* (2006.01)

(52) U.S. Cl.
CPC .......... *G06V 10/462* (2022.01); *G06F 18/214* (2023.01); *G06T 11/60* (2013.01)

(58) Field of Classification Search
CPC ...... G06V 10/462; G06V 10/44; G06V 10/82; G06V 20/62; G06V 40/161; G06F 18/214; G06T 11/60; G06T 2207/20081; G06T 2207/20084; G06T 2207/20164; G06T 7/11; G06T 2200/24

See application file for complete search history.

(56) References Cited

U.S. PATENT DOCUMENTS

| 2013/0163811 A1* | 6/2013 | Oelke | G06T 7/0008 |
| | | | 382/103 |
| 2018/0181593 A1* | 6/2018 | Ranzinger | G06V 10/82 |
| 2019/0340462 A1* | 11/2019 | Pao | G06V 10/82 |
| 2020/0327675 A1* | 10/2020 | Lin | G06T 7/194 |

* cited by examiner

*Primary Examiner* — Said Broome
*Assistant Examiner* — Andrew Shin
(74) *Attorney, Agent, or Firm* — MARSHALL, GERSTEIN & BORUN LLP

(57) ABSTRACT

Systems and methods for automatically determining and displaying salient portions of images are disclosed. According to certain aspects, an electronic device may support a design application that may apply a saliency detection learning model to a digital image, resulting in the application generating one or more salient portions of the digital image. The electronic device may generate a digital rendering of the salient portion of the image on digital models of items or products, and may enable a user to review the digital rendering. The user may also choose alternative salient portions of the digital image and/or aspect ratios for those salient portions for inclusion on a digital model of the item or product.

18 Claims, 17 Drawing Sheets

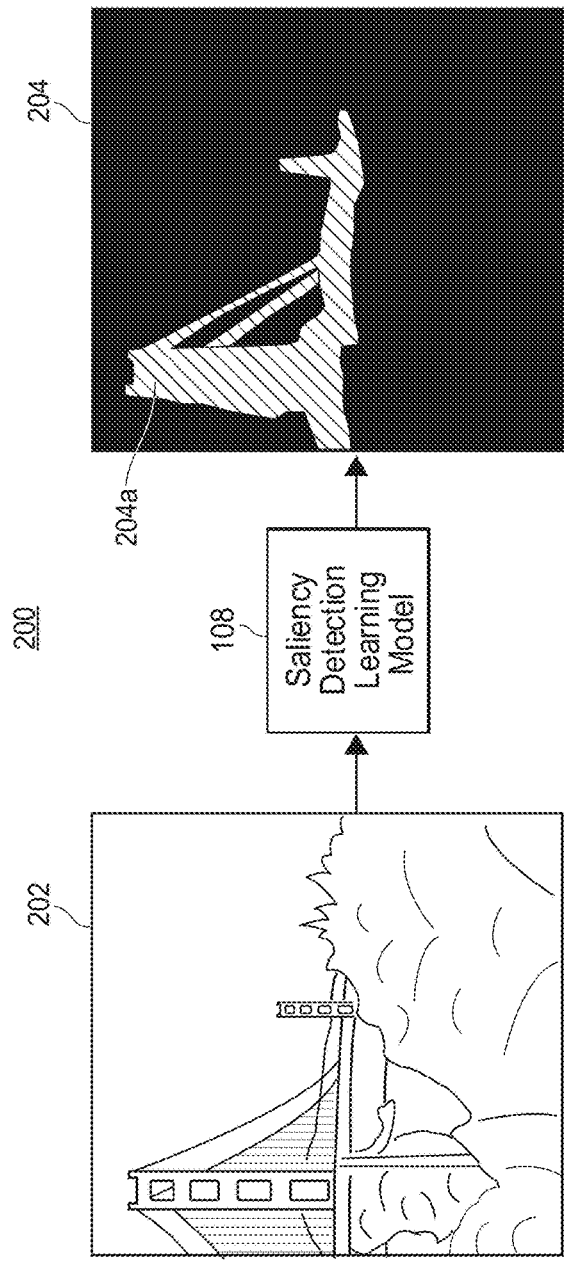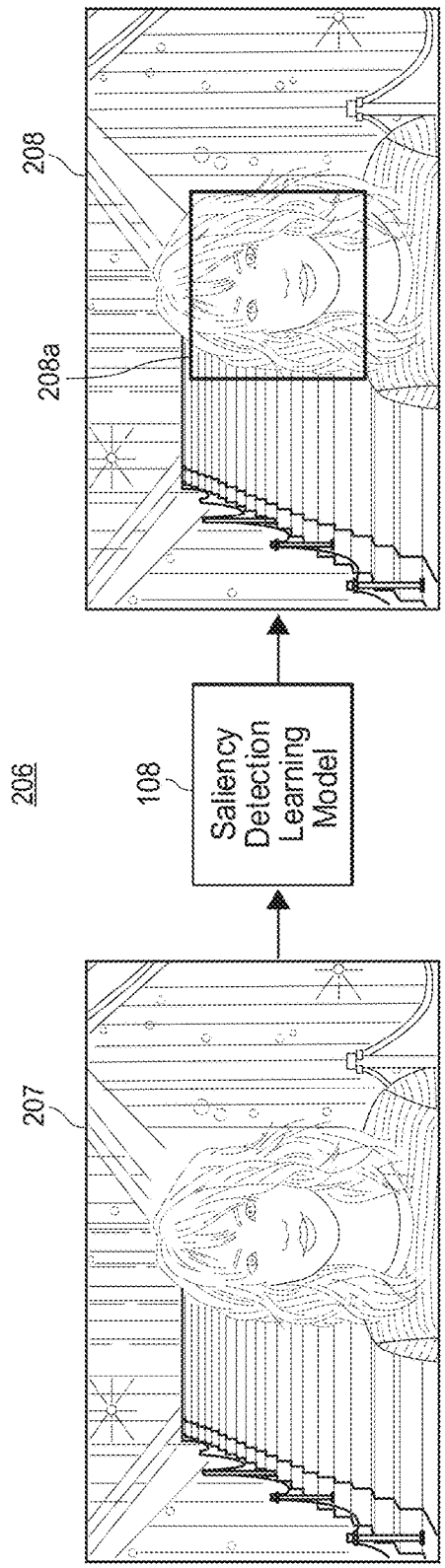
FIG. 2A
FIG. 2B

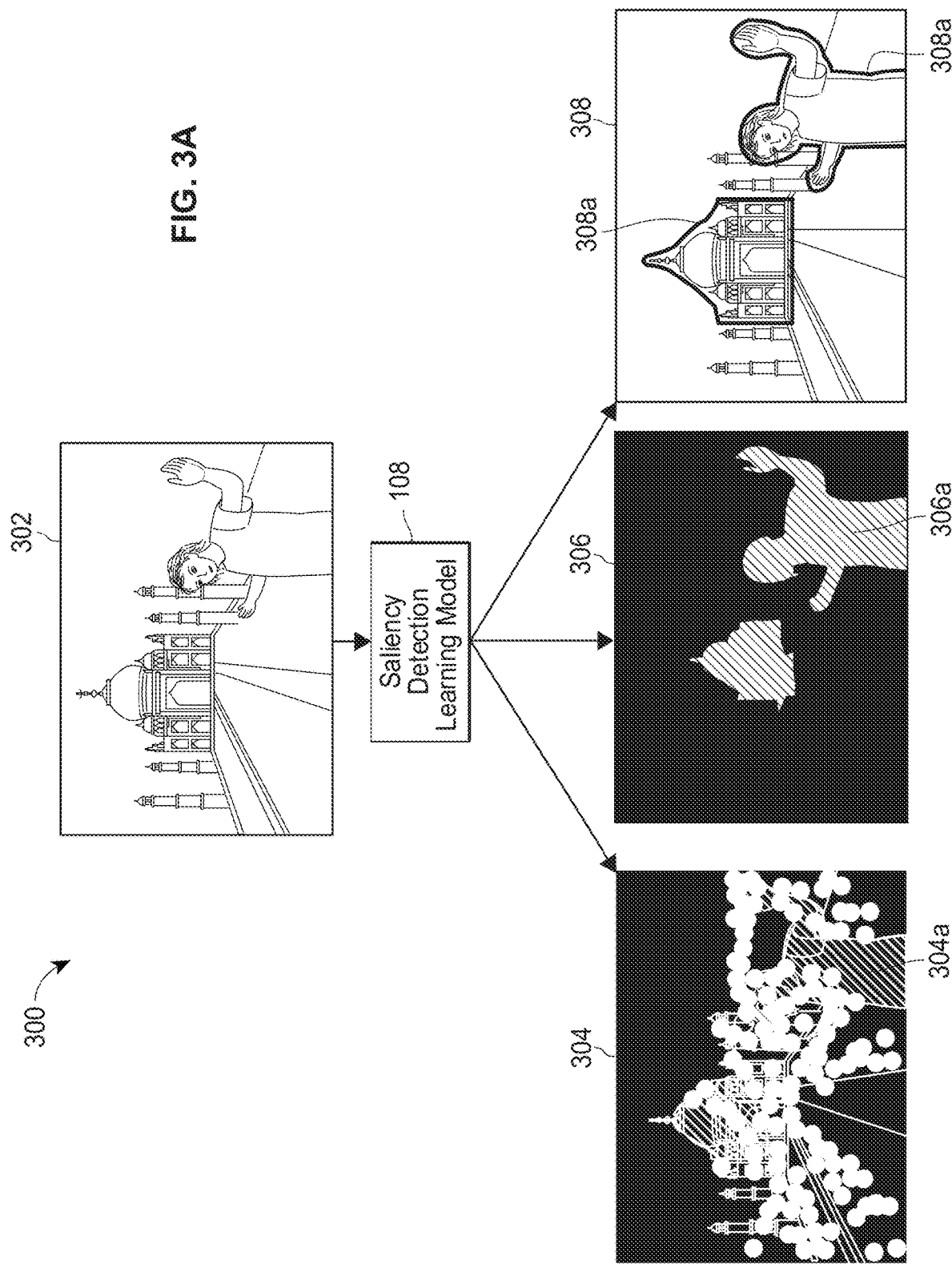

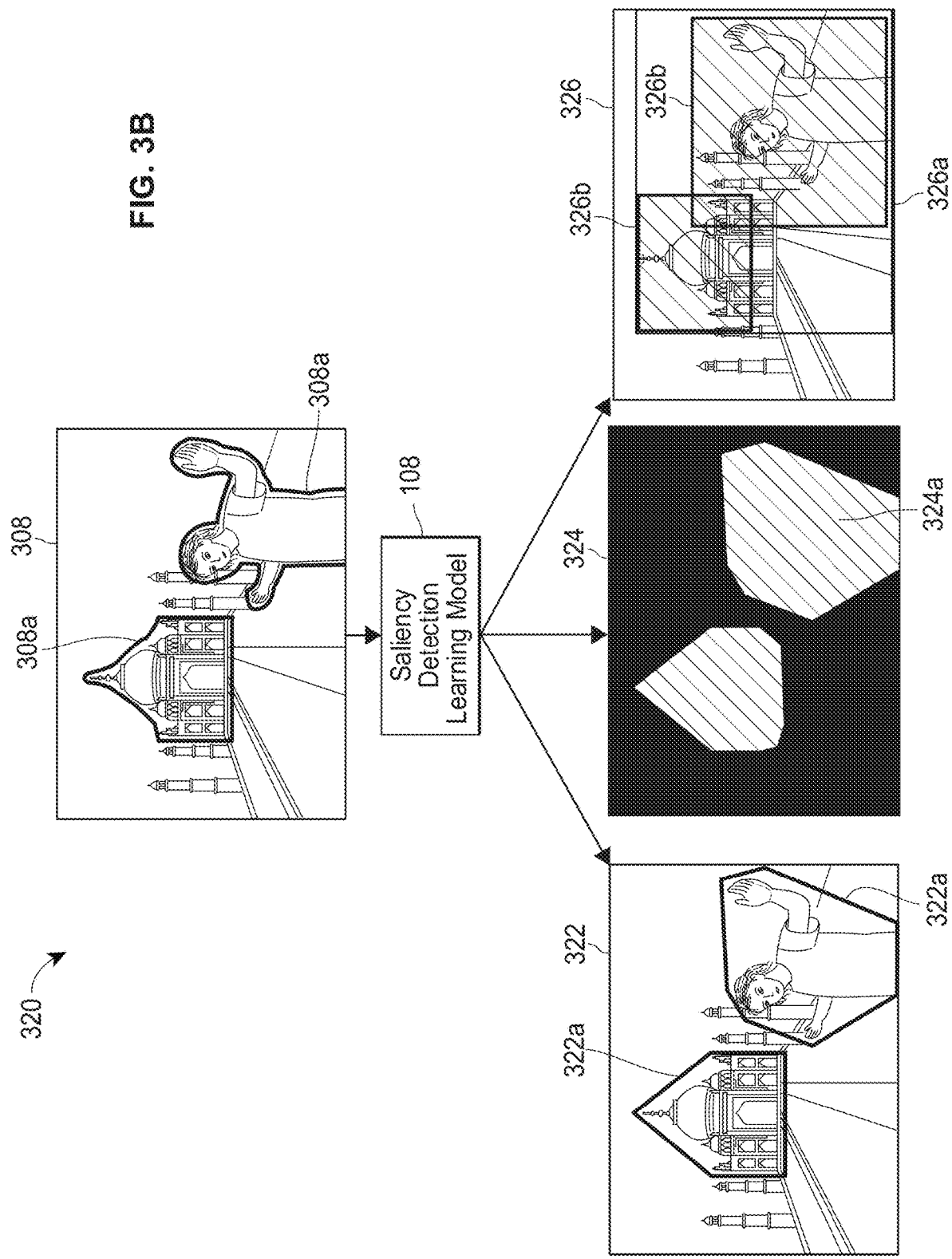

TECHNOLOGIES FOR AUTOMATICALLY DETERMINING AND DISPLAYING SALIENT PORTIONS OF IMAGES

FIELD

The present disclosure is directed to improvements related to digital image analysis/recognition. More particularly, the present disclosure is directed to platforms and technologies for automatically determining and displaying salient portions of images.

BACKGROUND

Various printing and design services (e.g., via websites) that enable users to design products are well known and widely used by many consumers, professionals, and businesses. Personalized products may include both printed paper products and customized promotional products including, for instance, various articles of clothing such as t-shirts. The services may enable users to upload images for display and manipulation as part of the product design process. Typically, the user may apply the uploaded images to the personalized products in order to visualize the application of the image to the product prior to purchasing/printing/etc.

It is advantageous for services to provide users a high-fidelity representation of the uploaded image, and more specifically, to allow users to utilize salient portions of the uploaded image for application to the personalized products. However, it is difficult to automatically determine the salient portions of uploaded images, as many uploaded images include a wide variety of image features, such as text, prominent objects, background objects, image effects, human faces, graphical designs, and others that cause conventional image processing techniques to make erroneous determinations. Further, many users are unfamiliar with or otherwise unable to manually crop/modify uploaded images in a manner sufficient to accurately yield the desired salient portion(s) of the uploaded images.

Therefore, there is an opportunity for systems and methods to accurately and effectively determine salient portions of images, including accurately and effectively automatically determining and displaying salient portions of images.

SUMMARY

In an embodiment, a computer-implemented method for automatically determining and displaying salient portions of images is provided. The computer-implemented method may include: accessing, by a processor, a digital image comprising pixel data of at least one feature of interest; analyzing, by the processor applying a saliency detection learning model, the digital image to generate at least one saliency map corresponding to the at least one feature of interest, the at least one saliency map selected from one or more saliency maps of the saliency detection learning model, wherein the saliency detection learning model is trained with pixel data of a plurality of training images depicting respective features of interest and is configured to output the one or more saliency maps corresponding to the respective features of interest; determining, by the processor, one or more salient portions of the digital image based on a weighted sum of each corresponding pixel from each of the at least one saliency map; and displaying, in a user interface, a portion of the digital image that includes at least the one or more salient portions.

According to another embodiment, a system for automatically determining and displaying salient portions of images is provided. The system may include: a user interface, a memory storing a set of computer-readable instructions comprising at least a saliency detection learning model that is trained with pixel data of a plurality of training images depicting respective features of interest and is configured to output the one or more saliency maps corresponding to the respective features of interest, and a processor interfacing with the user interface and the memory. The processor may be configured to execute the set of computer-readable instructions to cause the processor to: access a digital image comprising pixel data of at least one feature of interest, analyze, by applying the saliency detection learning model, the digital image to generate at least one saliency map corresponding to the at least one feature of interest, the at least one saliency map selected from the one or more saliency maps of the saliency detection learning model, determine one or more salient portions of the digital image based on a weighted sum of each corresponding pixel from each of the at least one saliency map, and cause a user interface to display a portion of the digital image that includes at least the one or more salient portions.

Further, in an embodiment, a non-transitory computer-readable storage medium is provided. The non-transitory computer-readable storage medium has stored thereon a set of instructions, where the set of instructions may comprise: instructions for accessing a digital image comprising pixel data of at least one feature of interest; instructions for analyzing, by applying a saliency detection learning model, the digital image to generate at least one saliency map corresponding to the at least one feature of interest, the at least one saliency map selected from one or more saliency maps of the saliency detection learning model, wherein the saliency detection learning model is trained with pixel data of a plurality of training images depicting respective features of interest and is configured to output the one or more saliency maps corresponding to the respective features of interest; instructions for determining one or more salient portions of the digital image based on a weighted sum of each corresponding pixel from each of the at least one saliency map; and instructions for displaying, in a user interface, a portion of the digital image that includes at least the one or more salient portions.

BRIEF DESCRIPTION OF THE FIGURES

FIGS. 2A-2E illustrate various example saliency detection sequences, in accordance with some embodiments.

FIGS. 3A-3C illustrate various example images and renderings associated with a saliency detect mode, in accordance with some embodiments.

DETAILED DESCRIPTION

Figure 1A:
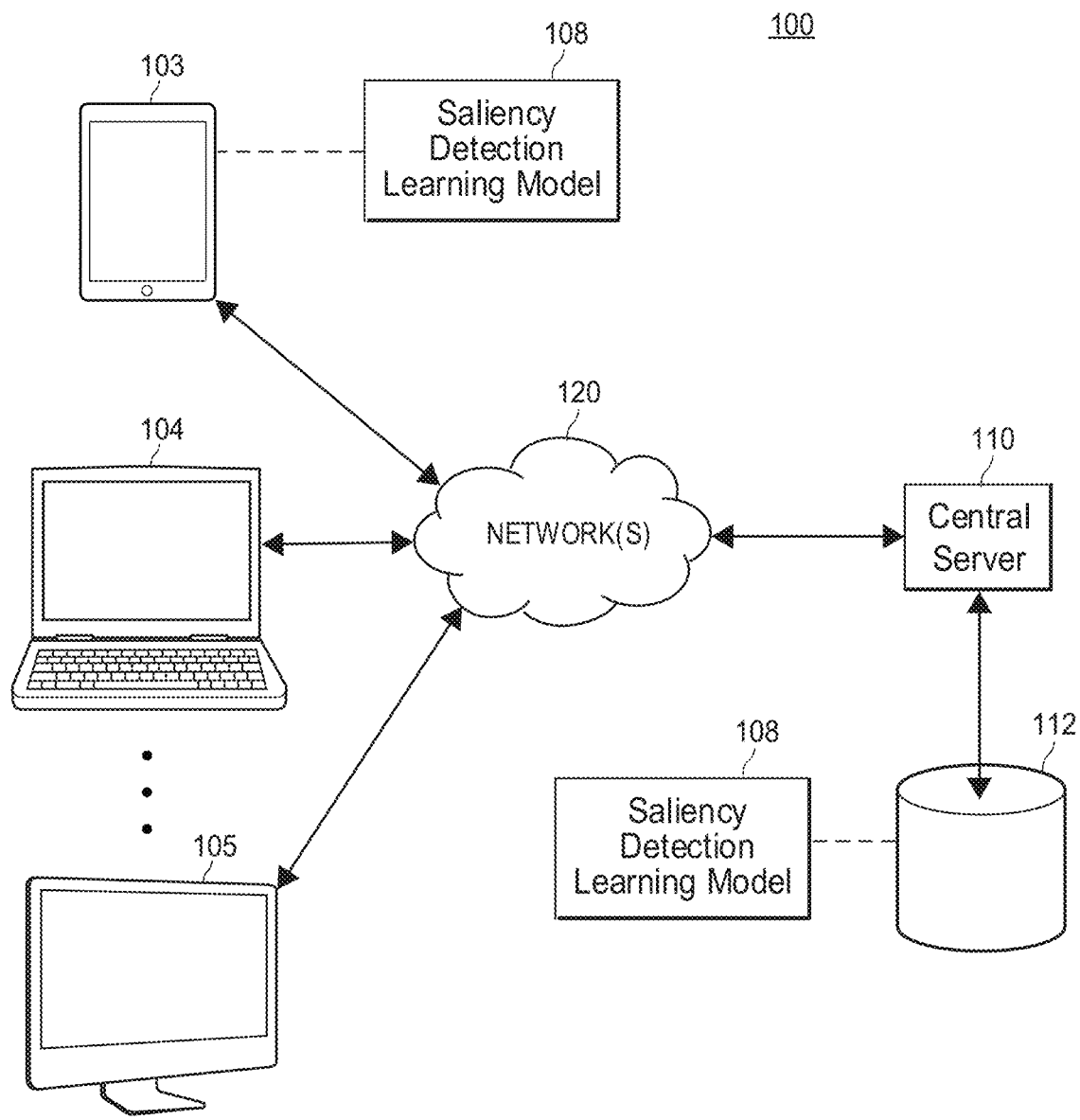
FIG. 1A depicts an overview of components and entities associated with the systems and methods, in accordance with some embodiments.

The present embodiments may relate to, inter alia, platforms and technologies for automatically determining and displaying salient portions of images. According to certain aspects, the systems and methods may support applying the determined salient portions of images to representations of items in order to incorporate the salient portions of the images as digital designs on the items. A user may use a design platform to select an image for upload and salient portion(s) determination, and the systems and methods of the present disclosure may analyze and process the image utilizing various machine learning techniques to determine a saliency map and thereafter display a portion of the digital image that includes a salient portion.

Generally, image saliency is highly subjective, and may be or include anything depending upon the image context. For example, assume a first image features only mountains while a second image features mountains in the image background with an automobile in the image foreground. In the first image, the mountains may be important (e.g., a salient image feature), whereas the automobile in the second image may be the salient image feature despite the presence of mountains in the background. Thus, training an object detection model and utilizing static rules to evaluate image saliency, as featured in conventional techniques, do not accurately or consistently determine salient portions of images. Instead, the systems and methods of the present disclosure solve these issues of conventional techniques by training and applying a salient detection learning model that generally focuses on the prominent parts of images uploaded by a user.

Of course, there can be multiple types of content in an image. For example, many images feature textual data along with objects (e.g., mountains, automobiles), and both data types may be important in the context of the image. Other real-world images may include living beings, objects, landscapes, text, line art, logos, etc., and may include some or all of these data types in different combinations. As an added frustration, images are often noisy based on variable backgrounds and types of objects present. For example, in images that feature blurry text or distracting/noisy graphical designs, it may be difficult for even humans to segregate/interpret the text included within the image.

To overcome these and other obstacles, the systems and methods of the present disclosure may include several general functions designed to accurately and consistently detect, crop, and fit the salient portions of images uploaded by users. For example, the systems and methods of the present disclosure may provide saliency detection, via application of the saliency detection learning model, which may detect/generate a saliency map and corresponding salient portions of an image using image processing and machine learning techniques (e.g., deep neural network (DNN)). In certain aspects, the systems and methods of the present disclosure may also include a saliency detection mode that generates bounding boxes over each of the salient portions of the image, a saliency crop mode that computes/generates multiple cropping suggestions for a user to consider related to the salient portions of the image, and a saliency fit mode that may compute a best fit suggestion for a user to fit the salient portions of the image to any suitable aspect ratio.

In any event, the systems and methods of the present disclosure may be used to simultaneously display a gallery of salient portions of an uploaded image. For instance, a user interface may display a variety of portions of a user's uploaded image that the various machine learning techniques identified as salient portions of the uploaded image. In these instances, the user may have the option to select which salient portion(s) the user desires to incorporate as a design onto a particular item (e.g., a mug, a pen, a sheet of paper, a t-shirt, etc.).

Moreover, the systems and methods of the present disclosure may automatically adjust the salient portion(s) of the uploaded image to fit any suitable aspect ratio. For example, a salient portion of a user's uploaded image may have an aspect ratio of 4:3, but a user may wish to apply the salient portion to an item that ideally suits images with an aspect ratio of 3:2. In this example, the systems and methods of the present disclosure may automatically determine and present the user with a variety of options related to fitting the salient portion of the image to the item at the 3:2 aspect ratio.

Some images may not feature readily identifiable salient portions, such as images with distorted text, blurry graphical designs, and multiple features of interest. For these images, the systems and methods of the present disclosure may automatically detect each of the salient portions of an image based on a multi-layered machine learning architecture. In this manner, the systems and methods of the present disclosure are capable of accurately and consistently determining the salient portions of images to a degree that was previously unachievable by conventional techniques.

To analyze and process an image to automatically determine and display the salient portions, the systems and methods of the present disclosure may access a digital image, and generate at least one saliency map corresponding to at least one feature of interest included in the digital image by applying a saliency detection learning model. The systems and methods of the present disclosure may determine one or more salient portions of the digital image based on a weighted sum of pixels from the at least one saliency map, and display a portion of the digital image that includes at least the one or more salient portions.

The systems and methods of the present disclosure offer numerous benefits. Specifically, the saliency detection of the present disclosure provides solutions in a number of situations where conventional techniques fail. For example, when a user desires to print an image on a small object, the systems and methods of the present disclosure enable the user to focus on and consider only the salient part of the image. Moreover, in many instances the uploaded image is physically larger than the printing area available. In these instances, conventional techniques force the user to resize the image in order to fit it within the printing area. By contrast, using the saliency detection of the present disclosure, a user can automatically fit a salient portion of the image to the printing area and cut any unnecessary parts of the image, such as plain areas, image background, and/or other non-salient areas.

The saliency detection of the present disclosure may also enhance a user's designing experience. Currently, users are required to perform manual operations like cropping or moving an image to fit the required content on an item/product. The saliency detection of the present disclosure can be used to fit the desired content in multiple ways into the required printing area, and the user can choose a preferred fit from the provided suggestions. For example, if the uploaded image has horizontal content and the user desires to fit the image on printing paper that is vertical, then the systems and methods of the present disclosure may automatically provide a rotated fit option as a recommendation to the user to enable fitting the uploaded image on the printing paper.

More generally, the systems and methods of the present disclosure support the accurate and consistent determination (also referenced herein as "detection"), cropping, and fitting of salient portions of digital images. This is particularly beneficial when the images include multiple features of interest, obscured features or graphical designs, and/or other image features (e.g., low contrast). Thus, a user reviewing the digital image portion(s) is afforded an accurate determination of the salient portions of the digital image, allowing the user to specify salient portions of the digital image for incorporation on personalized items, printing, etc. An entity or service that supports the systems and methods of the present disclosure may additionally be afforded an improved user experience and increased sales. However, it should be appreciated that additional benefits are envisioned.

Further, the systems and methods of the present disclosure include improvements in computer functionality or in improvements to other technologies at least because the disclosure describes that a computing device is improved where the intelligence or predictive ability of the computing device is enhanced by a trained (e.g., machine learning trained) saliency detection learning model. The saliency detection learning model, executing on the computing device, is able to more accurately generate, based on pixel data of other features of interest, at least one saliency map corresponding to at least one feature of interest included as part of the pixel data of a digital image.

That is, the present disclosure describes improvements in the functioning of the computer itself or "any other technology or technical field" because a computing device is enhanced with a plurality of training images (e.g., 10,000s of training images and related pixel data as feature data) to accurately predict, detect, or determine pixel data of user-uploaded images, such as newly provided user images. This improves over the prior art at least because existing systems lack such predictive or classification functionality and are simply not capable of accurately analyzing user-uploaded images to output a predictive determination associated with one or more salient portions of a digital image corresponding to the at least one saliency map.

The systems and methods discussed herein also improve the functioning of a computer by improving virtual design platforms. Conventionally, images presented to a user on such design platforms include irrelevant portions of the image, are cropped in a manner that eliminates salient portions of the image, and/or are erroneously sized (e.g., aspect ratio) for rendered items to which the image may be applied. The systems and methods of the present disclosure are an improvement to these conventional virtual design platforms because the present systems and methods employ various machine learning techniques to accurately detect, crop, and fit salient portions of digital images, resulting in an accurate rendering of uploaded digital images that conventional virtual design platforms are incapable of accomplishing.

FIG. 1A illustrates an overview of a system 100 of components configured to facilitate the systems and methods of the present disclosure. It should be appreciated that the system 100 is merely an example and that alternative or additional components are envisioned.

As illustrated in FIG. 1A, the system 100 may include a set of electronic devices 103, 104, 105 which may be used or operated by a set of users, such as any individual or person who may be interested in uploading, cropping, fitting, and/or saving a digital image(s) (e.g., for creating, sharing, and/or saving a digital design(s)). Each of the electronic devices 103, 104, 105 may be any type of electronic device such as a mobile device (e.g., a smartphone), desktop computer, notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like. Each of the electronic devices 103, 104, 105 may execute or interface with a design application or platform that enables the uploading, cropping, fitting, and/or saving of the digital image(s).

In certain aspects, an electronic device (e.g., electronic device 103) may include a saliency detection learning model 108 that is configured to generate at least one saliency map corresponding to at least one feature of interest included as part of the pixel data of a digital image uploaded to the electronic device by a user. The electronic device may thereby receive and process user-uploaded images to locally determine salient portions of the digital image that may be saved locally on a memory of the electronic device and/or used as part of a design application or platform (e.g., as hosted or otherwise facilitated by the central server 110). It will be appreciated that any of the electronic devices 103, 104, 105 may include the saliency detection learning model 108.

The electronic devices 103, 104 105 may communicate with a central server 110 via one or more networks 120. The central server 110 may be associated with the entity that owns, operates, and/or manages the design application or platform. In particular, the central server 110 may include or support a web server configured to host a website that enables users to operate the design application or platform. Further, the central server 110 may support a software application executable by the set of electronic devices 103, 104, 105 (i.e., the set of electronic devices 103, 104, 105 may interface with the central server 110 in executing the software application). In embodiments, the network(s) 120 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others).

Although depicted as a single central server 110 in FIG. 1A, it should be appreciated that the server 110 may be in the form of a distributed cluster of computers, servers, machines, or the like. In this implementation, the entity may utilize the distributed server(s) 110 as part of an on-demand cloud computing platform. Accordingly, when the electronic devices 103, 104, 105 interface with the server 110, the electronic devices 103, 104, 105 may actually interface with one or more of a number of distributed computers, servers, machines, or the like, to facilitate the described functionalities.

The central server 110 may be configured to interface with or support a memory or storage 112 capable of storing various data, such as in one or more databases or other forms of storage. According to embodiments, the storage 112 may store data or information associated with digital designs, formats, templates, and/or design elements for the digital designs and templates. For example, the storage 112 may store templates of digital designs, including design elements for the different templates.

Further, in some aspects, the storage 112 may include the saliency detection learning model 108 that is configured to generate at least one saliency map corresponding to at least one feature of interest included as part of the pixel data of a digital image uploaded or otherwise selected by a user. The central server 110 may thereby receive and process user-uploaded images to determine salient portions of the digital image by accessing the saliency detection learning model 108 from the storage 112. The salient portions of the user-uploaded digital image and/or any resulting digital designs may be saved in a memory of the storage 112.

Although three (3) electronic devices 103, 104, 105 and one (1) central server 110 are depicted in FIG. 1A, it should be appreciated that greater or fewer amounts are envisioned. For example, there may be multiple central servers, each one associated with a different entity.

Figure 1B:
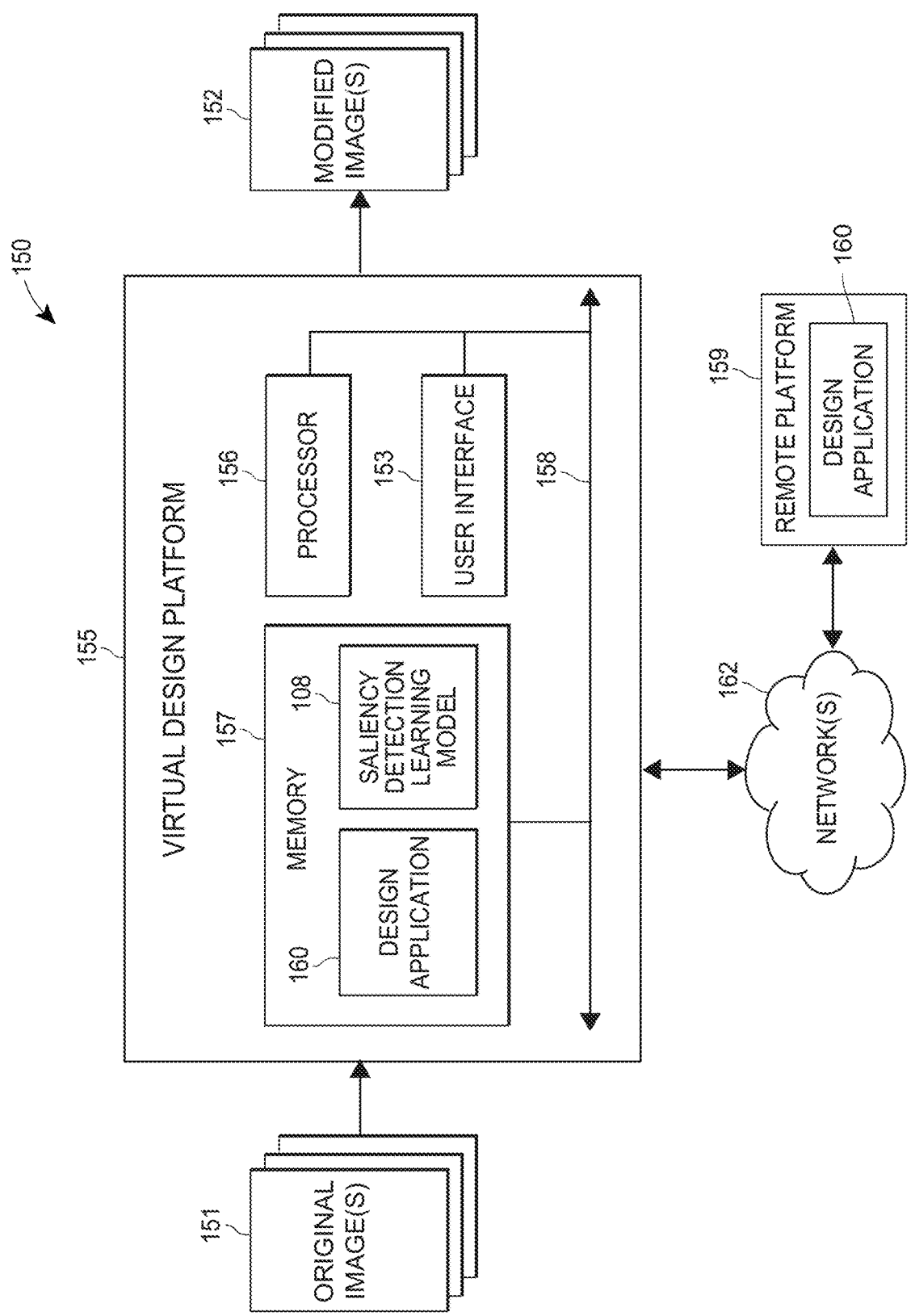
FIG. 1B depicts an overview of certain components configured to facilitate the systems and methods, in accordance with some embodiments.

According to embodiments, users of the electronic devices 103, 104, 105 may select a digital image(s) to upload and/or modify using the electronic devices 103, 104, 105, such as in contemplation of detecting, cropping, and fitting salient portion(s) of the digital image(s) using the saliency detection learning model 108 stored on one or more of the electronic devices 103, 104, 105, and/or the storage 112. The digital image(s) may include at least one digital image or video in various file formats (e.g., JPEG, TIFF, GIF, PNG, Raw, MP4, MOV, etc.), where the digital image(s) or video(s) may depict visual content that may be composed of one or more design elements. The users may use the respective electronic devices 103, 104, 105 to modify certain of the design elements of the salient portion(s) of the uploaded images across one or more formats before, during, and/or after the saliency detection learning model 108 processes the digital image(s) or video(s). When a particular digital image or video is processed via the saliency detection learning model 108, the user may select to print, order, send, share, or post the resulting salient digital image portion or digital rendering on an object for display or use. FIG. 1B depicts more specific components associated with the systems and methods.

FIG. 1B an example environment 150 in which an original image(s) 151 is processed into a modified image(s) 152 via a virtual design platform 155, according to embodiments. The virtual design platform 155 may be implemented on any computing device, including one or more of the electronic devices 103, 104, 105 or the server 110 as discussed with respect to FIG. 1A. Components of the computing device may include, but are not limited to, a processing unit (e.g., processor(s) 156), a system memory (e.g., memory 157), and a system bus 158 that couples various system components including the memory 157 to the processor(s) 156. In some embodiments, the processor(s) 156 may include one or more parallel processing units capable of processing data in parallel with one another. The system bus 158 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The virtual design platform 155 may further include a user interface 153 configured to present content (e.g., digital images, salient portions of digital images, digital designs and components/elements thereof). Additionally, a user may make selections to the content via the user interface 153, such as to modify/adjust digital images (or salient portions thereof) presented thereon. The user interface 153 may be embodied as part of a touchscreen configured to sense touch interactions and gestures by the user. Although not shown, other system components communicatively coupled to the system bus 158 may include input devices such as a cursor control device (e.g., a mouse, trackball, touch pad, etc.) and keyboard (not shown). A monitor or other type of display device may also be connected to the system bus 158 via an interface, such as a video interface. In addition to the monitor, computers may also include other peripheral output devices such as a printer, which may be connected through an output peripheral interface (not shown).

The memory 157 may include a variety of computer-readable media. Computer-readable media may be any available media that can be accessed by the computing device and may include both volatile and nonvolatile media, and both removable and non-removable media. By way of non-limiting example, computer-readable media may comprise computer storage media, which may include volatile and nonvolatile, removable and non-removable media implemented in any method or technology for storage of information such as computer-readable instructions, routines/algorithms (e.g., the saliency detection learning model 108), applications (e.g., the design application 160), data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the processor 156 of the computing device.

The virtual design platform 155 may operate in a networked environment and communicate with a remote platform 159 including the design application 160, via a network 162, such as a local area network (LAN), a wide area network (WAN), or other suitable network.

According to embodiments, the virtual design platform 155 (and more particularly, the design application 160) may process or modify the original image(s) 151 to produce the modified image(s) 152 by applying the saliency detection learning model 108. Each of the original image(s) 151 and each of the modified image(s) 152 may be embodied as any type of electronic image, video, document, file, template, etc., that may include some type of displayable content (e.g., a combination of textual and/or visual content). More generally, the modified image(s) 152 may include the original image(s) 151 as well as salient portions of the original image(s) 151 that may be detected, cropped, and fitted in accordance with a saliency map generated by the saliency detection learning model 108.

The design application 160 may enable a user to modify and select certain salient portions of the original image(s) 151 to create modified image(s) 152 to share, communicate, apply to items, or save for later use. Salient portions of images may vary among the original image(s) 151 and/or based on the corresponding item(s) to which a user may intend to apply the original image(s) 151. For example, a first respective original image may include a single feature of interest, such that the saliency detection learning model 108 detects a single salient portion of the first respective original image. In this example, the modified image(s) 152 corresponding to the first respective original image may include the first respective original image and a modified image featuring the single salient portion of the first respective original image. As another example, a second respective original image may include three features of interest, such that the saliency detection learning model 108 detects three salient portions of the second respective original image. In this example, the modified image(s) 152 corresponding to the second respective original image may include the second respective original image and six modified images featuring all possible combinations of the three salient portions of the second respective original image.

As previously mentioned, the saliency detection learning model (e.g., saliency detection learning model 108) is an artificial intelligence (AI) based model trained with at least one AI algorithm. Training of the saliency detection learning model 108 involves image analysis of the training images to configure weights of the saliency detection learning model 108, and its underlying algorithm (e.g., machine learning or artificial intelligence algorithm) used to predict and/or classify future images. For example, in various embodiments herein, generation of the saliency detection learning model 108 involves training the saliency detection learning model 108 with the plurality of training images depicting respective features of interest, where each of the training images comprise pixel data. In some embodiments, one or more processors of a server or a cloud-based computing platform (e.g., central server 110) may receive the plurality of training images depicting the respective features of interest via a computer network (e.g., network 120). In such embodiments, the server and/or the cloud-based computing platform may train the saliency detection learning model 108 with the pixel data of the plurality of training images.

In various embodiments, a machine learning imaging model, as described herein (e.g. saliency detection learning model 108), may be trained using a supervised or unsupervised machine learning pro-gram or algorithm. For example, the machine learning program or algorithm may employ a neural network, which may be a convolutional neural network (CNN), a deep learning neural network (DNN), or a combined learning module or program that learns in two or more features or feature datasets (e.g., pixel data) in particular areas of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. In some embodiments, the artificial intelligence and/or machine learning based algorithms may be included as a library or package executed on any of the electronic devices 103, 104, 105, and/or the central server 110 (e.g., via accessing the model in the storage 112). For example, libraries may include the TENS ORFLOW based library, the PYTORCH library, the SCIKIT-LEARN Python library, and/or the OpenCV library.

Machine learning may involve identifying and recognizing patterns in existing data (such as identifying features of interest in the pixel data of images, as described herein) in order to facilitate making predictions or identification for subsequent data (such as using the model on new pixel data of a new image in order to determine or generate at least one saliency map corresponding to the at least one feature of interest).

Machine learning model(s), such as the saliency detection learning model described herein for some embodiments, may be created and trained based upon example data (e.g., "training data" and related pixel data) inputs or data (which may be termed "features" and "labels") in order to make valid and reliable predictions for new inputs, such as testing level or production level data or inputs. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based on the discovered rules, relationships, or model, an expected output.

In unsupervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated.

Supervised learning and/or unsupervised machine learning may also comprise retraining, relearning, or otherwise updating models with new, or different, information, which may include information received, ingested, generated, or otherwise used over time. The disclosures herein may use one or both of such supervised or unsupervised machine learning techniques.

In certain aspects, the virtual design platform 155 may enable storing the modified image(s) 152 in the memory 157 or other storage, and/or may upload the modified image(s) 152 to the remote platform 159 for use in association with the design application 160 stored thereon. Moreover, according to embodiments, the original image(s) 151 and the modified image(s) 152 may include at least one digital image or video in various file formats (e.g., JPEG, TIFF, GIF, PNG, Raw, MP4, MOV, etc.).

FIGS. 2A-2E illustrate various example images associated with saliency detection, in accordance with some embodiments. Generally speaking, the example images may be uploaded by a user to a virtual design platform which may support a design application (e.g., design application 160) and may apply a saliency detection learning model (e.g., saliency detection learning model 108). An electronic device may execute the design application, apply the saliency detection learning model, and may display the example images in a user interface and receive selections associated with the example images via the user interface. The electronic device may interface with other hardware components, such as a remote platform.

FIG. 2A depicts an example object detection sequence 200 that includes the saliency detection learning model 108 receiving a first image 202 as input and outputting a second image 204. Generally, and as previously mentioned, image saliency may be a subjective decision, but some objects may consistently/reliably take priority over others given the image context. For example, line art shapes like logos and written text may be more preferred portions of a given image than background objects or graphics. To encapsulate this information, the saliency detection learning model 108 may incorporate an ensemble technique utilizing a variety of image processing and deep learning-based algorithms to detect different types of structures within uploaded images. Specifically, the saliency detection learning model 108 may perform various techniques to detect these different image structure types (also referenced herein as "data types") including: (i) object detection to assign appropriate weighting for entities included within images such as cars, humans, landscapes, food items, etc.; (ii) facial detection to assign appropriate weighing to human faces while computing saliency; (iii) text detection to detect and assign appropriate weighting to line art and text within the image; (iv) shape detection to assign appropriate weighting to symbols or logos present in the image; and (v) important feature detection to assign appropriate weighting to foreground and background image content. The saliency detection learning model 108 may accurately detect each data type within an image in order to make a comprehensive evaluation of the salient data included within the image. To illustrate, the saliency detection learning model 108 may perform text detection to detect all text/line art included in an image at a very high accuracy to avoid partial detection of the text/line art within an image that unintentionally omits a portion of the text/line art data within the image.

Referring to FIG. 2A, the first image 202 may be a color or greyscale digital image captured by a user and/or retrieved by a user from a database/online resource and uploaded to a virtual design platform (e.g., virtual design platform 155 executing on an electronic device 103, 104, 105) for analysis. As previously mentioned, the saliency detection learning model 108 may be a machine learning-based model/algorithm, and may specifically utilize a deep learning model pipeline, such as a deep neural network (DNN). For example, the saliency detection learning model 108 may be based on a U-Net style architecture, and may perform pixel-based segmentation where each pixel carries the weight of its importance, as described herein. As a result, the saliency detection learning model 108 may output a saliency map (e.g., a U-Net based saliency map), as illustrated by the patterned sections 204a of the second image 204.

In the example of FIG. 2A, the saliency map corresponds to the object (e.g., the bridge) featured in the first image 202. Thus, the saliency detection learning model 108 may be trained with thousands of training images containing objects in order to accurately and consistently detect the salient portions of the object included in the first image 202, and to correspondingly output the saliency map illustrated by the patterned sections 204a featured in the second image 204.

FIG. 2B illustrates an example facial detection sequence 206 that includes the saliency detection learning model 108 receiving a first image 207 as input and outputting a second image 208. Generally, the first image 207 may be a color or greyscale digital image captured by a user and/or retrieved by a user from a database/online resource and uploaded to a virtual design platform (e.g., virtual design platform 155 executing on an electronic device 103, 104, 105) for analysis. In some aspects, the saliency detection learning model 108 may include a multiple layered deep learning architecture configured to recognize the facial features of a human being (e.g., a facial recognition algorithm).

Accordingly, the first image 207 may include a human being, and more particularly, a portion or all of a face of the human being. The saliency detection learning model 108 may receive the first image 207 as input and may output the second image 208 that contains a saliency map 208a corresponding to the recognized face of the human being included in the images 207, 208. As such, the saliency detection learning model 108 may be trained with thousands of training images containing human faces in order to accurately and consistently detect the salient portions of the human face included in the first image 207, and to correspondingly output the saliency map 208a featured in the second image 208. For example, after the training to detect salient portions of the human face is complete, the saliency detection learning model 108 may automatically assign greater weighting values to detected human facial features/whole faces when compared to other portions of a human body detected within an image (e.g., torso, arms, legs, etc.).

Figure 2C:
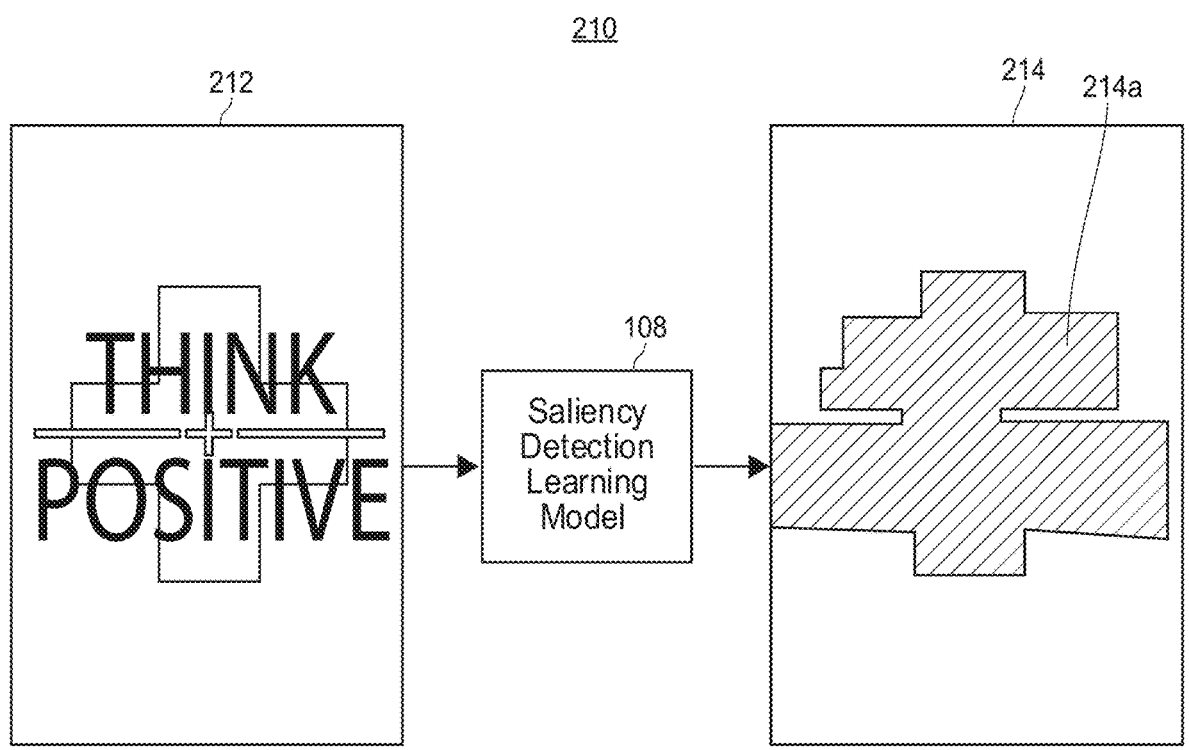

FIG. 2C illustrates an example text detection sequence 210 that includes the saliency detection learning model 108 receiving a first image 212 as input and outputting a second image 214. Generally, the first image 212 may be a color or greyscale digital image captured by a user and/or retrieved by a user from a database/online resource and uploaded to a virtual design platform (e.g., virtual design platform 155 executing on an electronic device 103, 104, 105) for analysis. In some aspects, the saliency detection learning model 108 may include a multiple layered deep learning architecture configured to recognize any textual or line art type features included within an uploaded image (e.g., an optical character recognition (OCR) algorithm).

Accordingly, the first image 212 may include a logo or some line art that features text. The saliency detection learning model 108 may receive the first image 212 as input and may output the second image 214 that contains a saliency map, as illustrated by the patterned sections 214a, corresponding to the recognized line art and text included in the images 212, 214. As such, the saliency detection learning model 108 may be trained with thousands of training images containing textual data and/or line art data in order to accurately and consistently detect the salient portions of the text and line art included in the first image 212, and to correspondingly output the saliency map 214a featured in the second image 214.

Figure 2D:
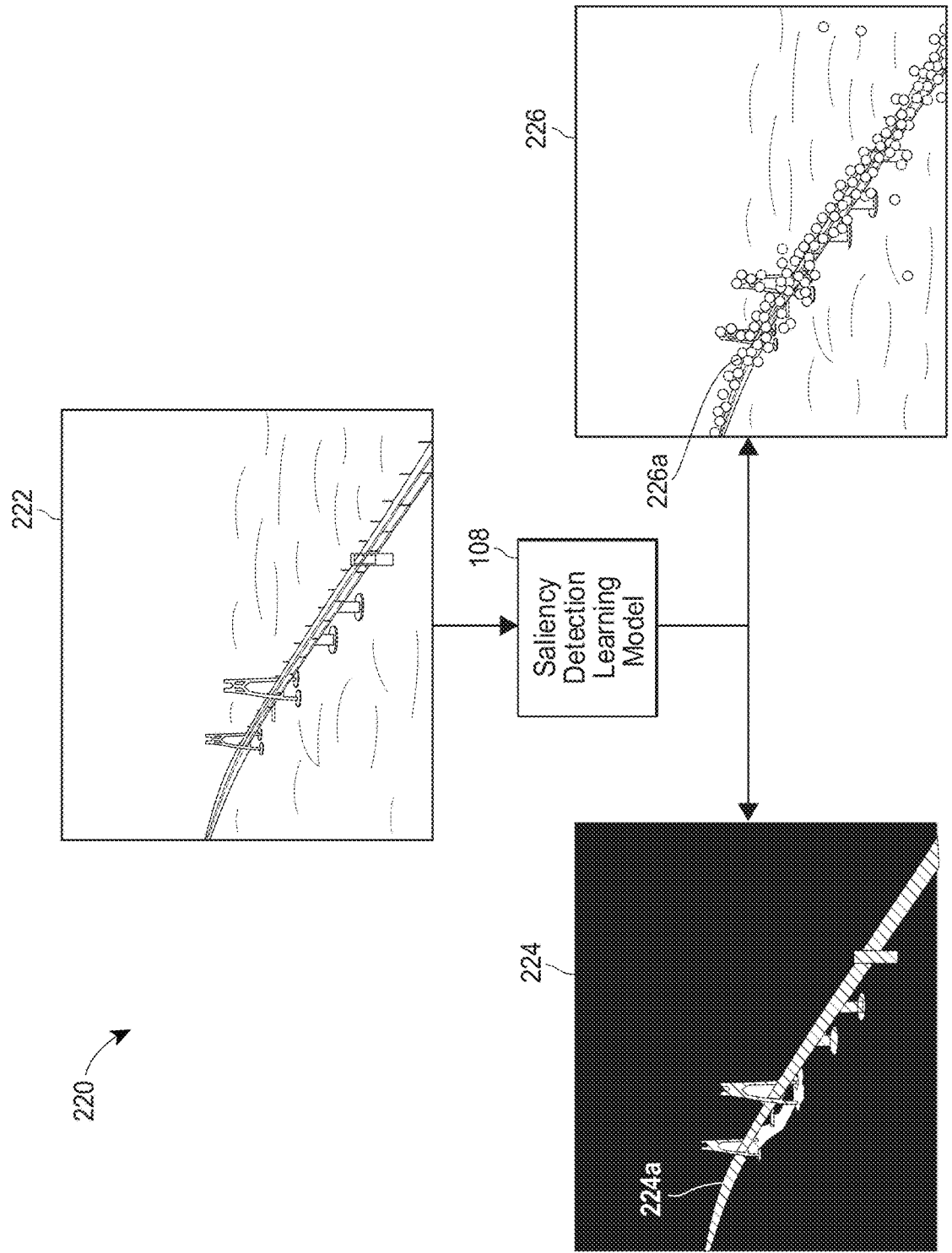

FIG. 2D illustrates an example shape and feature detection sequence 220 that includes the saliency detection learning model 108 receiving a first image 222 as input and outputting a second image 224 and a third image 226. Generally, the first image 222 may be a color or greyscale digital image captured by a user and/or retrieved by a user from a database/online resource and uploaded to a virtual design platform (e.g., virtual design platform 155 executing on an electronic device 103, 104, 105) for analysis. When evaluating the first image 222 as part of the example shape and feature detection sequence 220, the saliency detection learning model 108 may generate a shape-based saliency map, as illustrated by the patterned sections 224a of the second image 224. Additionally, the saliency detection learning model 108 may generate a feature-based saliency map, as illustrated by the dotted sections 226a of the third image 226. In some aspects, the saliency detection learning model 108 may include a multiple layered deep learning architecture configured to recognize the shapes and/or other features included within an uploaded image (e.g., edge detection algorithm).

Accordingly, the first image 222 may include a feature of interest (e.g., a bridge) which the saliency detection learning model 108 may analyze to determine one or both of a shape and features corresponding to the feature of interest. The saliency detection learning model 108 may receive the first image 222 as input and may output the second image 224 with the shape-based saliency map (e.g., patterned sections 224a) and the third image 226 with the feature-based saliency map (e.g., dotted sections 226a). It is to be understood that the saliency detection learning model 108 may output the second image 224 and the third image 226 in any suitable order or simultaneously. Moreover, the saliency detection learning model 108 may be trained with thousands of training images containing shape data and/or feature data in order to accurately and consistently detect the salient portions of the feature of interest included in the first image 222, and to correspondingly output the saliency maps 224a, 226a featured in the images 224, 226.

Figure 2E:
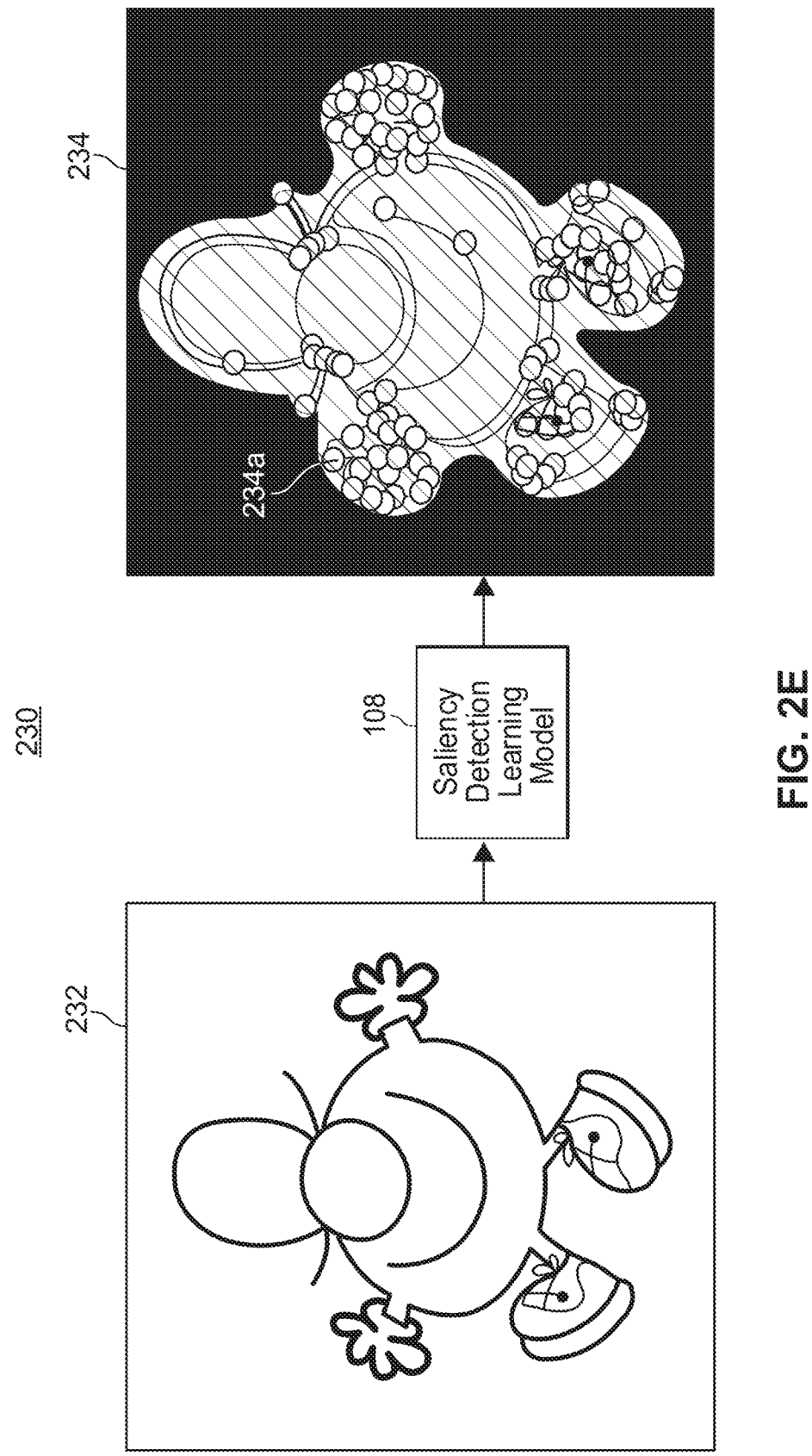

FIG. 2E illustrates an example ensemble detection sequence 230 that includes the saliency detection learning model 108 receiving a first image 232 as input and outputting an ensemble image 234. Generally, the first image 232 may be a color or greyscale digital image captured by a user and/or retrieved by a user from a database/online resource and uploaded to a virtual design platform (e.g., virtual design platform 155 executing on an electronic device 103, 104, 105) for analysis. In some aspects, the saliency detection learning model 108 may include an ensemble multiple layered deep learning architecture configured to recognize any objects, human faces, text, line art, shapes, and/or features included within an uploaded image.

Accordingly, the first image 232 may include a graphic design (e.g., an illustrated character) that comprises an object, line art, shapes, and features. The saliency detection learning model 108 may receive the first image 232 as input and may output the ensemble image 234 that contains an ensemble saliency map, as illustrated by the patterned and dotted sections 234a, corresponding to the recognized object, line art, shapes, and features included in the images 232, 234. The ensemble saliency map 234a may represent a weighted combination of respective saliency maps corresponding to each of the object, line art, shapes, and features included in the images 232, 234.

Of course, in certain aspects, the first image may include any combination of objects, human faces, text, line art, shapes, and/or features, and the saliency detection learning model 108 may output an ensemble image that includes an ensemble saliency map corresponding to each of the respective objects, human faces, text, line art, shapes, and/or features included in the first image. In these aspects, the weighting associated with each respective saliency map may correspond directly to the number of saliency maps and data types included in the ensemble saliency map. For example, the first image 232 does not contain a human face, and as a result, the weighting associated with the human face saliency map computed by the saliency detection learning model 108 for the first image 232 may cause the human face saliency map to negligibly influence the salient portions determined based on the ensemble saliency map, as discussed herein. As such, the saliency detection learning model 108 may be trained with thousands of training images containing object data, human face data, text data, line art data, shape data, and/or feature data in order to accurately and consistently detect the salient portions of the objects, human faces, text, line art, shapes, and/or features included in the first image 232, and to correspondingly output the ensemble saliency map 234a featured in the ensemble image 234.

The example interfaces, thus, may be example interfaces of the design application.

FIGS. 3A-3H illustrate various example images and renderings associated with a saliency detect mode, in accordance with some embodiments. Generally, the saliency detect mode may be a further application of the saliency detection learning model (e.g., saliency detection learning model 108), wherein the saliency detection learning model may be trained to compute bounding boxes over salient portions of images. For example, the saliency detection learning model may compute bounding boxes over portions of images that are indicated by the saliency maps described in reference to FIGS. 2A-E. As described herein, the saliency detect mode may enable the systems and methods of the present disclosure to, inter alia, detect important portions of user-uploaded images that cross or are otherwise excluded by trim lines of virtual design platforms.

FIG. 3A illustrates an example first sequence 300 of the saliency detect mode of the saliency detection learning model (e.g., saliency detection learning model 108). Generally, the example first sequence 300 may be a first half of a larger sequence configured to generate a union box over all salient portions of the input image 302, described herein in reference to FIG. 3B. The example first sequence 300 includes three broad determinations/calculations made by the saliency detection learning model that generally include determining an ensemble saliency map (represented by the dotted and patterned sections 304a of the ensemble image 304), performing image thresholding on the ensemble saliency map to generate the thresholding image 306, and performing contour detection on the thresholding image 306 to generate the contour image 308. The saliency detection learning model 108 may receive the input image 302 as input, and may thereafter generate each of the images 304, 306, 308 as output. More specifically, the saliency detection learning model 108 may generate the ensemble image 304 using the input image 302 as input, may generate the thresholding image 306 using the ensemble image 304 as input, and may generate the contour image 308 using the thresholding image 306 as input, and/or any suitable combinations thereof.

As an example, the saliency detection learning model 108 may receive the input image 302 as input, and as a result may generate the ensemble image 304 as output. The ensemble image 304 may include the ensemble saliency map 304a, and the saliency detection learning model 108 may utilize the ensemble image 304 as further input to generate the thresholding image 306. The saliency detection learning model 108 may generate the thresholding image 306 by adjusting the weighting associated with the salient portions of the ensemble saliency map. For example, portions of the ensemble saliency map that are indicated as salient based on a single saliency map (e.g., line art saliency map) may be given no weight (e.g., eliminated from consideration) when determining the edges of the threshold regions, as illustrated by the patterned sections 306a, of the thresholding image 306. By contrast, portions of the ensemble saliency map that are indicated as salient based on multiple saliency maps (e.g., object saliency map, feature-based saliency map, line art saliency map) may be given maximum weight (e.g., included) when determining the edges of the threshold regions 306a of the thresholding image 306. The saliency detection learning model 108 may thereafter apply an edge detection algorithm or other suitable algorithm to determine the edges of the threshold regions 306a indicated in the thresholding image 306.

Continuing the prior example, the saliency detection learning model 108 may utilize the thresholding image 306 as further input to generate the contour image 308. The contour image 308 includes contour regions 308a that bound the salient regions of the input image 302 based on the edges of the threshold regions 306a of the thresholding image 306. The saliency detection learning model 108 may apply a contour detection algorithm and/or any other suitable algorithm or combinations thereof to the thresholding image 306 to eliminate interior portions of the threshold regions 306a, and as a result, identify the contour regions 308a of the contour image 308. When the saliency detection learning model 108 generates the contour image 308, the saliency detection learning model 108 may continue to an example second sequence 320 of the saliency detect mode, as illustrated in FIG. 3B.

The example second sequence 320 includes another three broad determinations/calculations made by the saliency detection learning model that generally include fitting a smallest convex polygon to each of the contour regions 308a to generate the convex hull fit image 322, determining a minimal bounding fit rectangle for each convex polygon to generate the bounding rectangle image 324, and combining each minimal bounding fit rectangle to generate the union box image 326. The saliency detection learning model 108 may receive the contour image 308 as input, and may thereafter generate each of the images 322, 324, 326 as output. More specifically, the saliency detection learning model 108 may generate the convex hull fit image 322 using the contour image 308 as input, may generate the bounding rectangle image 324 using the convex hull fit image 322 as input, and may generate the union box image 326 using the bounding rectangle image 324 as input.

To illustrate, the saliency detection learning model 108 may receive the contour image 308 as input, and may fit a smallest convex polygon 322a to each contour region 308a included as part of the contour image 308. The smallest convex polygon fitted to each contour region 308a may generally include all points of the contour regions 308a over which they are fit. When the saliency detection learning model 108 generates the convex hull fit image 322, the saliency detection learning model 108 may utilize the convex hull fit image 322 as input to output the bounding rectangle image 326 by calculating the extreme values of each smallest convex polygon. For example, the bounding rectangle image 326 includes bounding rectangle regions 324a that the saliency detection learning model 108 uses to calculate a minimum bounding fit rectangle that may encompass all extreme values (e.g., at the furthest spaced edges of the smallest convex polygons 322a) of each respective smallest convex polygon.

When the saliency detection learning model 108 generates the bounding rectangle image 324, the saliency detection learning model 108 may utilize the bounding rectangle image 324 as input to output the union box image 326 by combining all minimum bounding rectangles to calculate a union box 326a. The union box 326a may represent a smallest rectangle that encompasses (e.g., includes) all points included as part of all bounding rectangles (represented by the patterned sections 326b).

Figure 3C:
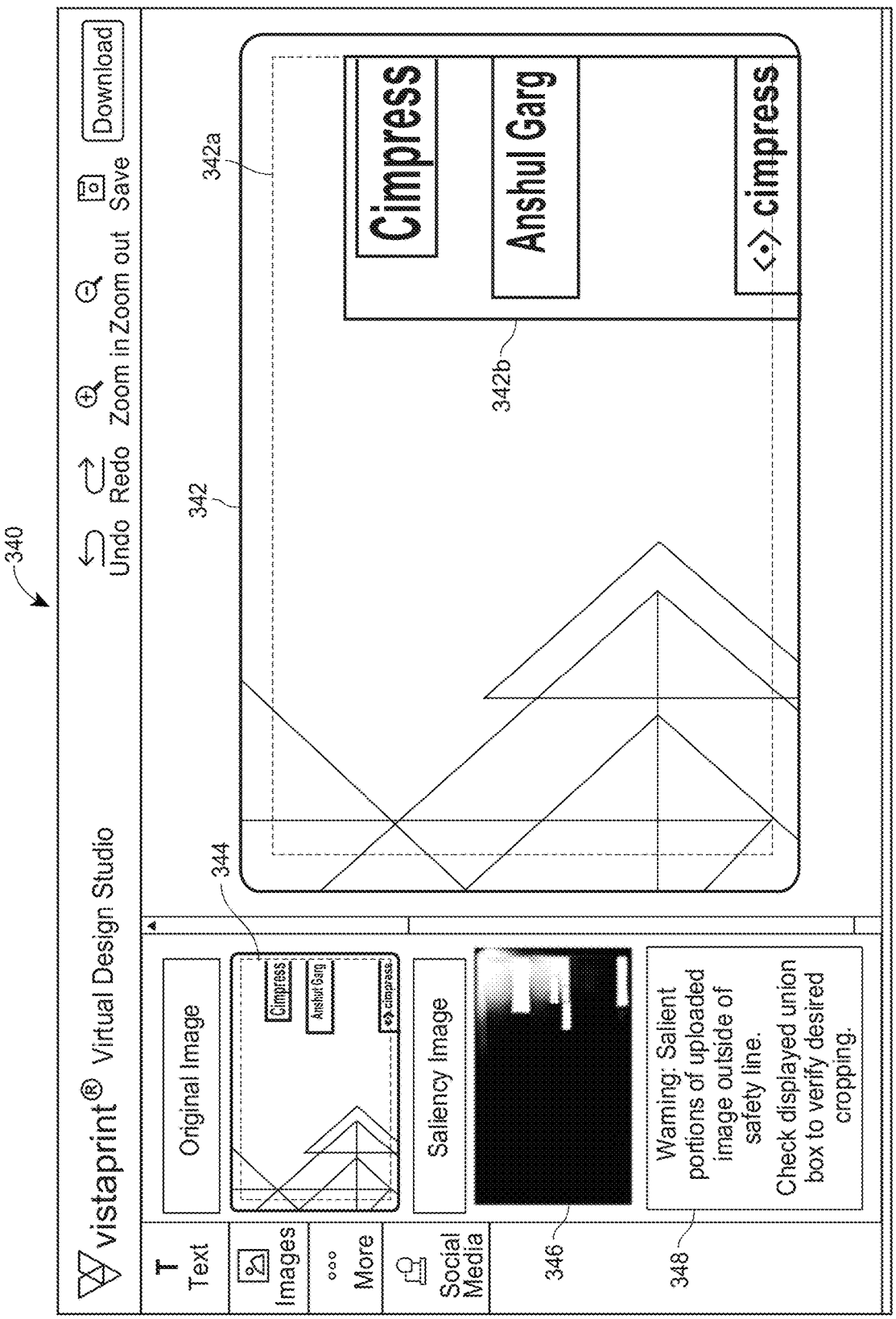

As a result of the saliency detection learning model 108 performing the example first and second sequences 300, 320, the virtual design platform may inform a user when a proposed crop of a user-uploaded image crosses a trim line. As illustrated in FIG. 3C, the example rendering 340 may represent an example user interface configured to alert a user that the proposed cropping of the user's uploaded image (e.g., of a business card) may eliminate a portion of a salient region of the uploaded image. The example rendering 340 may include a union box image 342 that includes a safety line 342a indicating the portions of the union box image 342 that may be removed/remain after cropping the union box image 342 along the safety line 342a, and a union box 342b indicating the salient portion of the union box image 342 that may be removed or partially cropped as indicated by the positioning of the safety line 342a.

As an example, the safety line 342a may indicate that any portions of the union box image 342 that extend beyond the interior of the area encompassed by the safety line 342a may be removed from the image when a user accepts the proposed cropping of the union box image 342. This may be undesirable, and indeed is a prevalent issue with conventional systems. However, the saliency detection learning model 108 may analyze the original image 344, as described herein, and may determine a saliency image 346 that indicates the detected salient portions of the original image 344. The saliency detection learning model 108 may also analyze the saliency image 346, in accordance with the example first and second sequences 300, 320 to generate the union box 342b. When the user interacts with a virtual design platform to potentially crop the union box image 342, the user may receive a warning 348 indicating that a portion or all of the union box 342 (and thereby some or all of a salient portion of the union box image 342) is crossing the safety line 342a. This warning 348 may alert a user to change the proposed cropping to include the salient content within the union box 342, and may thereby avoid user dissatisfaction over salient content being excluded from the resultant image design. In certain aspects, the saliency detection learning model 108 and/or other suitable components may not generate a warning if no salient content is determined to cross the safety line.

When the saliency detection learning model 108 successfully generates a union box over the salient portions of an image, the model 108 may additionally generate cropping and/or aspect ratio fitting suggestions to a user to further improve the user's experience and ease of use of the underlying virtual design platform. For example, FIGS. 4A and 4B illustrate various example renderings associated with a saliency crop mode that may utilize the saliency detection learning model 108 to generate salient crop suggestions for users.

Figure 4A:
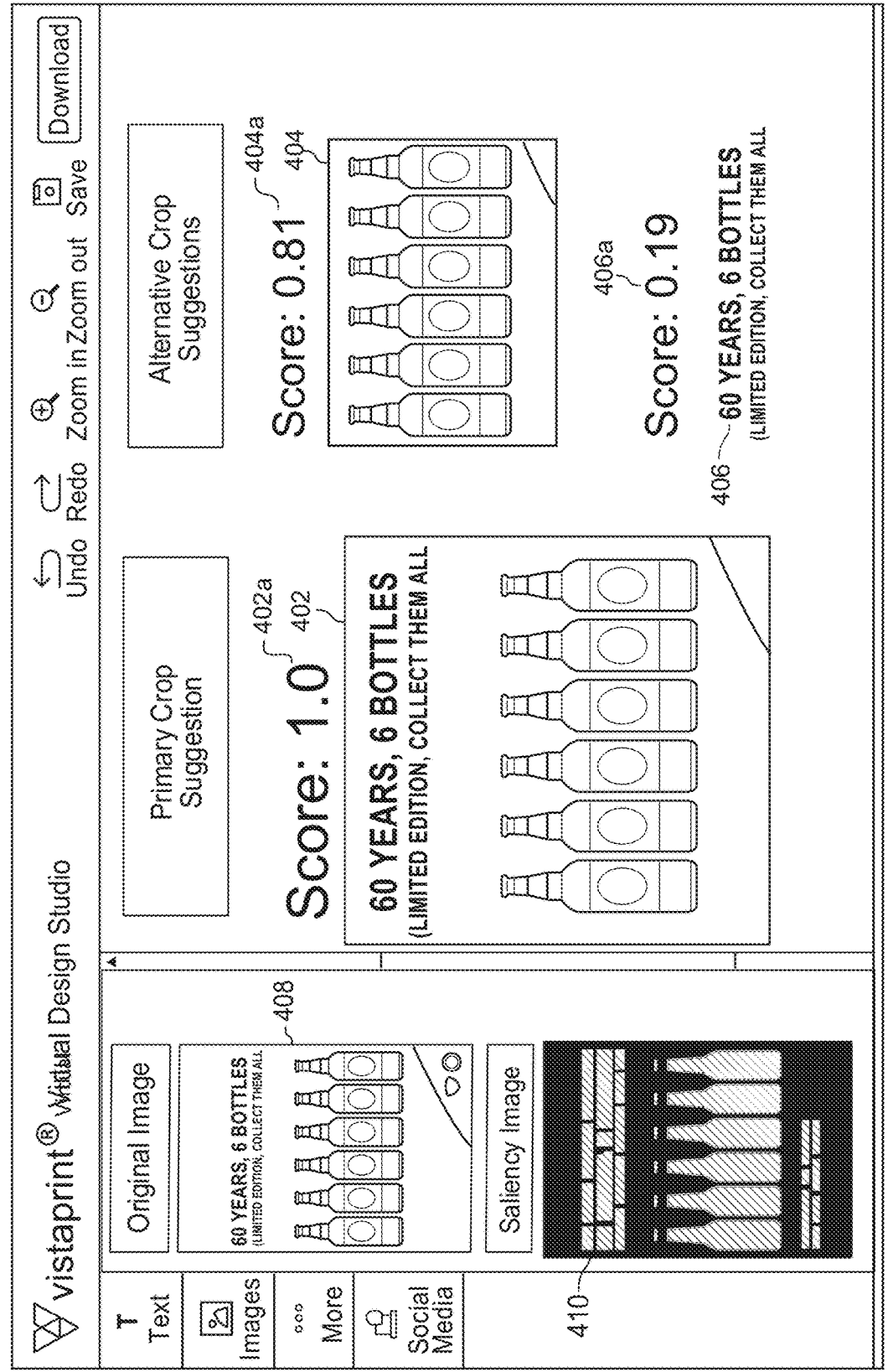
FIGS. 4A and 4B illustrate various example renderings associated with a saliency crop mode, in accordance with some embodiments.
Figure 4B:
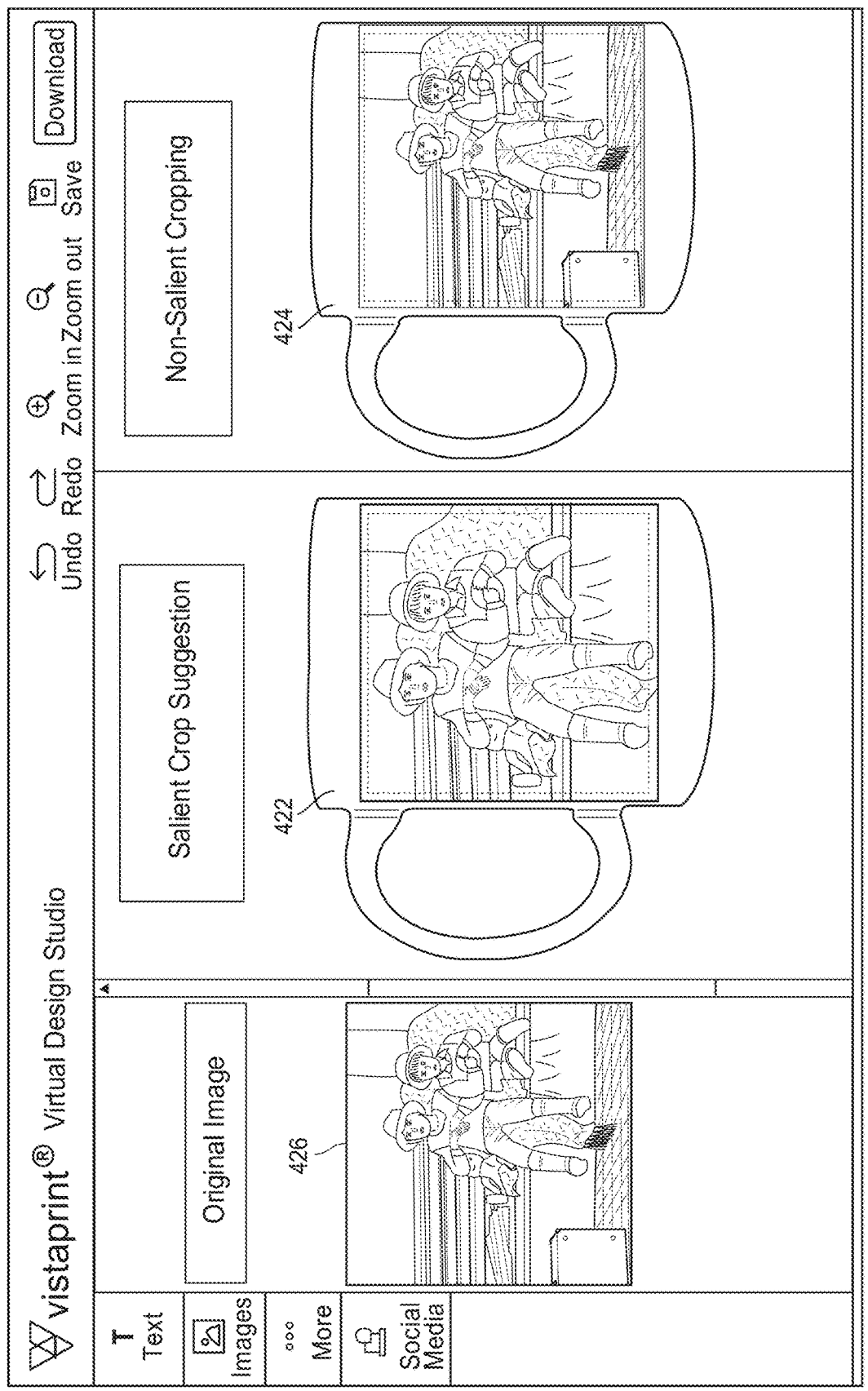

FIG. 4A illustrates a first example saliency crop rendering 400 that may be a user interface presented to a user as part of a virtual design platform (e.g., virtual design platform 155). The first example saliency crop rendering 400 may include a primary crop suggestion 402, and the suggestion 402 may be presented as part of the rendering 400 with a corresponding primary crop suggestion saliency score 402a. Further, the first example saliency crop rendering 400 may include alternative crop suggestions that include a first alternative crop suggestion 404 and a corresponding first alternative crop suggestion saliency score 404a, and a second alternative crop suggestion 406 and a corresponding second alternative crop suggestion saliency score 406a.

Generally, the saliency detection learning model 108 may generate each of the crop suggestions 402, 404, 406 based on the saliency map (represented in the saliency image 410) and the union box determined for the original image 408. Specifically, the saliency detection learning model 108 may apply object-based and position-based clustering algorithms to combine salient content within the original image 408 into various combinations. As a result, the saliency detection learning model 108 may segregate between different types of objects included within the original image 408, and produce multiple suggestions for a user to evaluate and select.

To determine combinations of salient regions of original image 408, the saliency detection learning model 108 may calculate saliency scores 402a, 404a, 406a for the content included within each minimal bounding fit rectangle based on the pixel-wise saliency of the content. The saliency detection learning model 108 may use the saliency scores 402a, 404a, 406a to, for example, rank the crop suggestions 402, 404, 406. When the saliency scores 402a, 404a, 406a are calculated, the saliency detection learning model 108 may generate the multiple crop suggestions 402, 404, 406 by determining a certain number of salient combinations of the salient content within the original image 408. For example, the saliency detection learning model 108 may combine the content represented in the first alternative crop suggestion 404 and the second alternative crop suggestion 406 to generate the primary crop suggestion 402. As a result, the primary crop suggestion saliency score 402a may be the sum of the first alternative crop suggestion saliency score 404a and the second alternative crop suggestion saliency score 406a. Of course, it is to be understood that the saliency score associated with a crop suggestion containing multiple salient portions of an image may be any suitable value corresponding to the respective saliency scores of the individual salient portions comprising the crop suggestion.

For example, the original image 408 includes both line art content and object content, which the saliency detection learning model 108 may detect as distinct salient regions within the original image 408. Namely, the text located at the top and bottom of the original image 408 as well as the bottles in the middle of the original image 108 may be salient portions of the image 408 that the saliency detection learning model 108 may detect as distinct salient regions and combine into the various crop suggestions 402, 404, 406. As illustrated in FIG. 4A, individual (e.g., 404, 406) and combined (e.g., 402) crop suggestions may be presented to a user. In certain aspects, if the entire combined salient content (e.g., the primary crop suggestion 402) cannot be displayed, printed, or otherwise presented to a user together in a particular format (e.g., side-by-side) due to practical restrictions related to printing size, etc., then the saliency detection learning model 108 may align the salient content in an alternative format (e.g., top-down) automatically for presentation to a user.

In particular, the saliency crop mode of the saliency detection learning model 108 may be utilized in cases where print objects are small in size like mugs, pens, stickers, etc. In these cases, it is typically wise to remove irrelevant content and focus only on the salient portion(s) of the image. For example, FIG. 4B illustrates a second example saliency crop rendering 420 that may be a user interface displayed to a user. The second example saliency crop rendering 420 highlights an advantage of the saliency detection learning model 108 saliency crop mode by comparing a saliency crop suggestion mug rendering 422 versus an original image mug rendering 424.

The saliency detection learning model 108 may receive the original image 426 as input from a user, and may determine a salient portion of the image 426, in accordance with the techniques described herein. The saliency detection learning model 108 may then display the salient portion of the original image 426 to the user as applied to a print object, such as the mug of the saliency crop suggestion mug rendering 422. In doing so, the saliency detection learning model 108 may provide attractive, useful image crop suggestions to a user to improve their experience and overall satisfaction with a virtual design platform (e.g., virtual design platform 155) in a manner that conventional systems cannot achieve.

When the saliency detection learning model 108 determines and generates a saliency crop suggestion, the model 108 may also need to fit the crop suggestion to a particular aspect ratio specified by a user. For example, FIGS. 5A-5D illustrate various example images and renderings associated with a saliency fit mode that may utilize the saliency detection learning model 108 to generate saliency fit suggestions for users with salient crop suggestions.

Figure 5A:
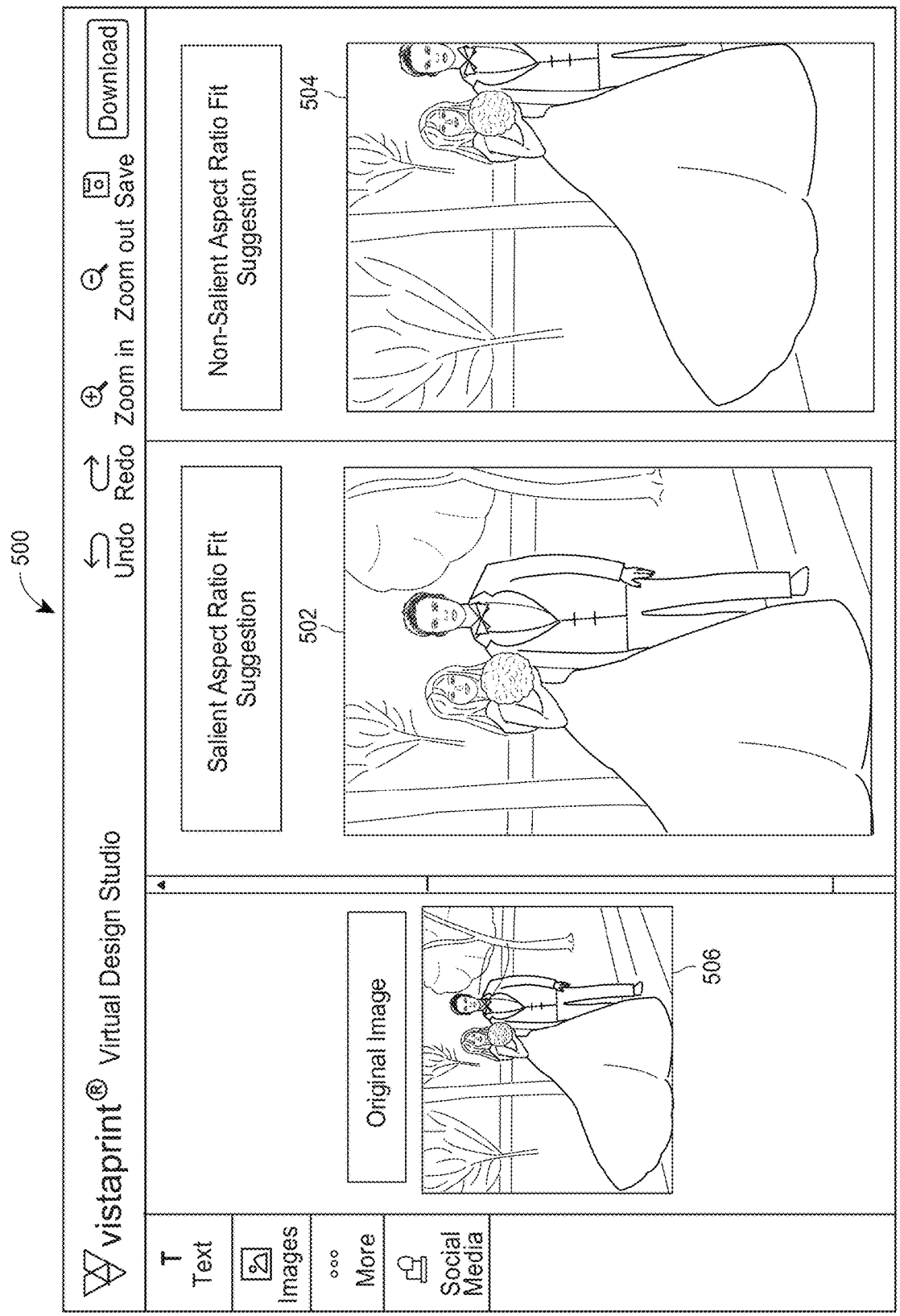
FIGS. 5A-5D illustrate various example images and renderings associated with a saliency fit mode, in accordance with some embodiments.

FIG. 5A illustrates a first example saliency fit rendering 500 that may be a user interface presented to a user as part of a virtual design platform (e.g., virtual design platform 155). Generally, if the print area (e.g., an A-4 size label) is in an aspect ratio that differs from the input image (e.g., original image 506), then the saliency detection learning model 108 may resize or crop the input image to fit the salient content within the boundaries of the print area. As previously described, the saliency detection learning model 108 may generally differentiate between the salient portions of an image and the irrelevant/background portions of the image. Thus, the saliency detection learning model 108 may receive the original image 506 as input, and may determine and generate a salient aspect ratio fit suggestion 502 based on the determined salient portions of the original image 506 and that the aspect ratio of original image 506 differs from the print area. By contrast, the virtual design platform (e.g., virtual design platform 155) may also provide a non-salient aspect ratio fit suggestion 504 that does not utilize the saliency fit mode of the saliency detection learning model 108. The non-salient aspect ratio fit suggestion 504 may include a middle portion of the original image 506 in order to roughly fit the middle portion of the original image 506 onto the print area. As illustrated, the salient aspect ratio fit suggestion 502 includes more of the couple represented in the image than the non-salient aspect ratio fit suggestion 504, as this is likely the intended salient portion of the original image 506.

To determine saliency fit suggestions, the saliency detection learning model 108 may determine a saliency map for an input image (e.g., original image 506) and generate filters corresponding to the aspect ratios of interest. The saliency detection learning model 108 may then convolve each of the generated filters over the saliency map to determine a best fit portion that has a highest respective saliency score compared to all other fit portions. Additionally, or alternatively, the saliency detection learning model 108 may perform some or all of the saliency crop mode described herein with respect to FIGS. 4A and 4B to determine salient crop suggestions for the best fit portion for each respective generated filter.

The saliency detection learning model 108 may thereafter fit the best fit portion and/or the salient crop suggestions to a particular aspect ratio. If necessary, the saliency detection learning model 108 may add padding to a particular best fit portion to fit the best fit portion to the particular aspect ratio. However, in certain aspects, if the amount of padding added to a particular best fit portion exceeds a padding threshold, then the saliency detection learning model 108 may automatically generate rotated saliency fit suggestions for the best fit portion.

Figure 5B:
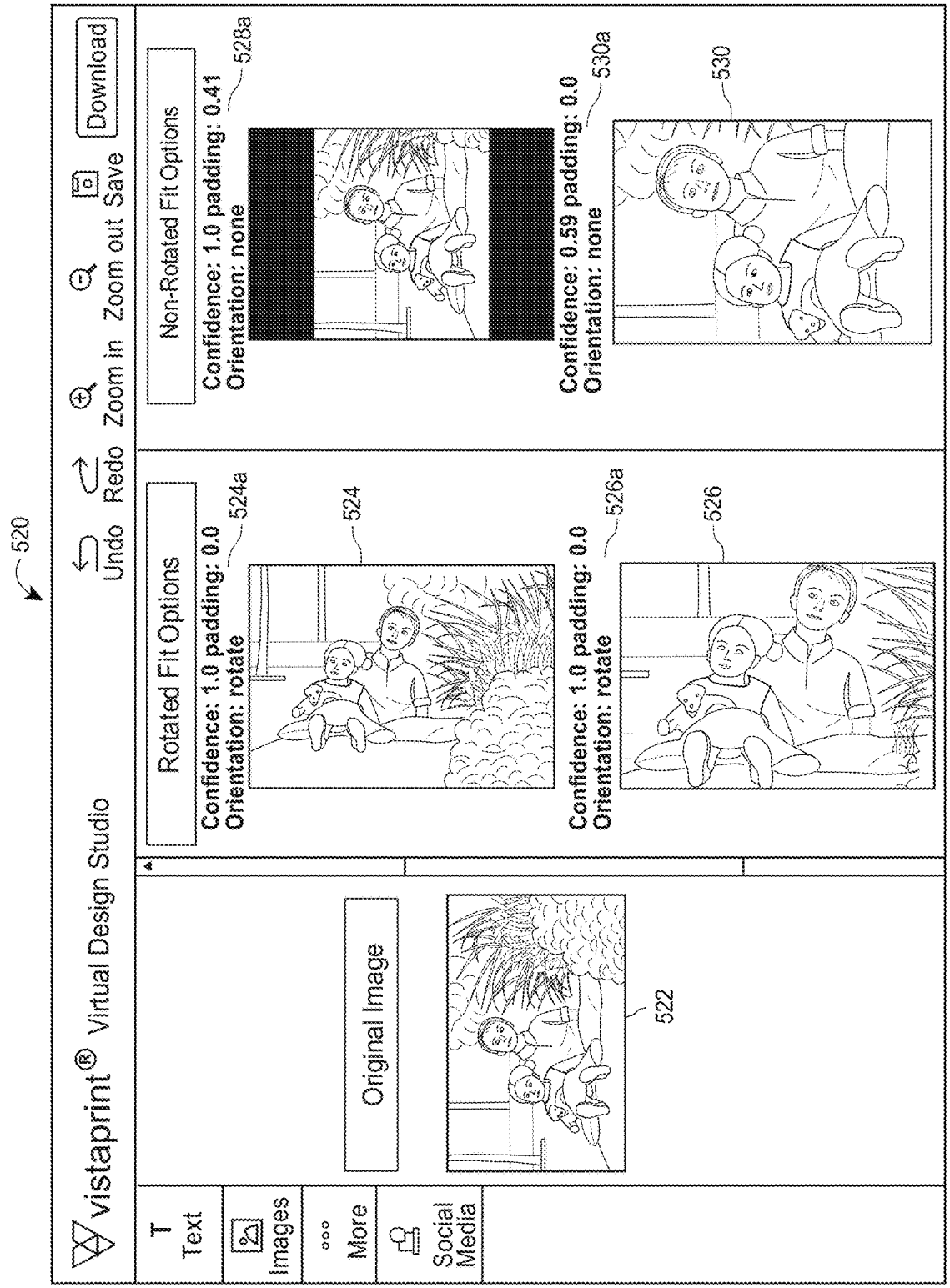

For example, FIG. 5B illustrates a second example saliency fit rendering 520 that may be a user interface presented to a user as part of a virtual design platform (e.g., virtual design platform 155), and that may include several saliency fit options generated by the saliency detection learning model 108 based on an original image 522 as input. Each of the saliency fit options 524, 526, 528, 530 may include respective fit scores 524a, 526a, 528a, 530a that indicate to a user the amount of salient content included in the respective saliency fit option 524, 526, 528, 530, the amount of padding added to the saliency fit option, and the orientation of the saliency fit option. As such, the saliency detection learning model 108 may present a user with multiple saliency fit options to effectively fit salient portions of the user's input image to any desired aspect ratio, thereby reducing the manual effort of cropping and fitting the image to fit a print area.

Figure 5C:
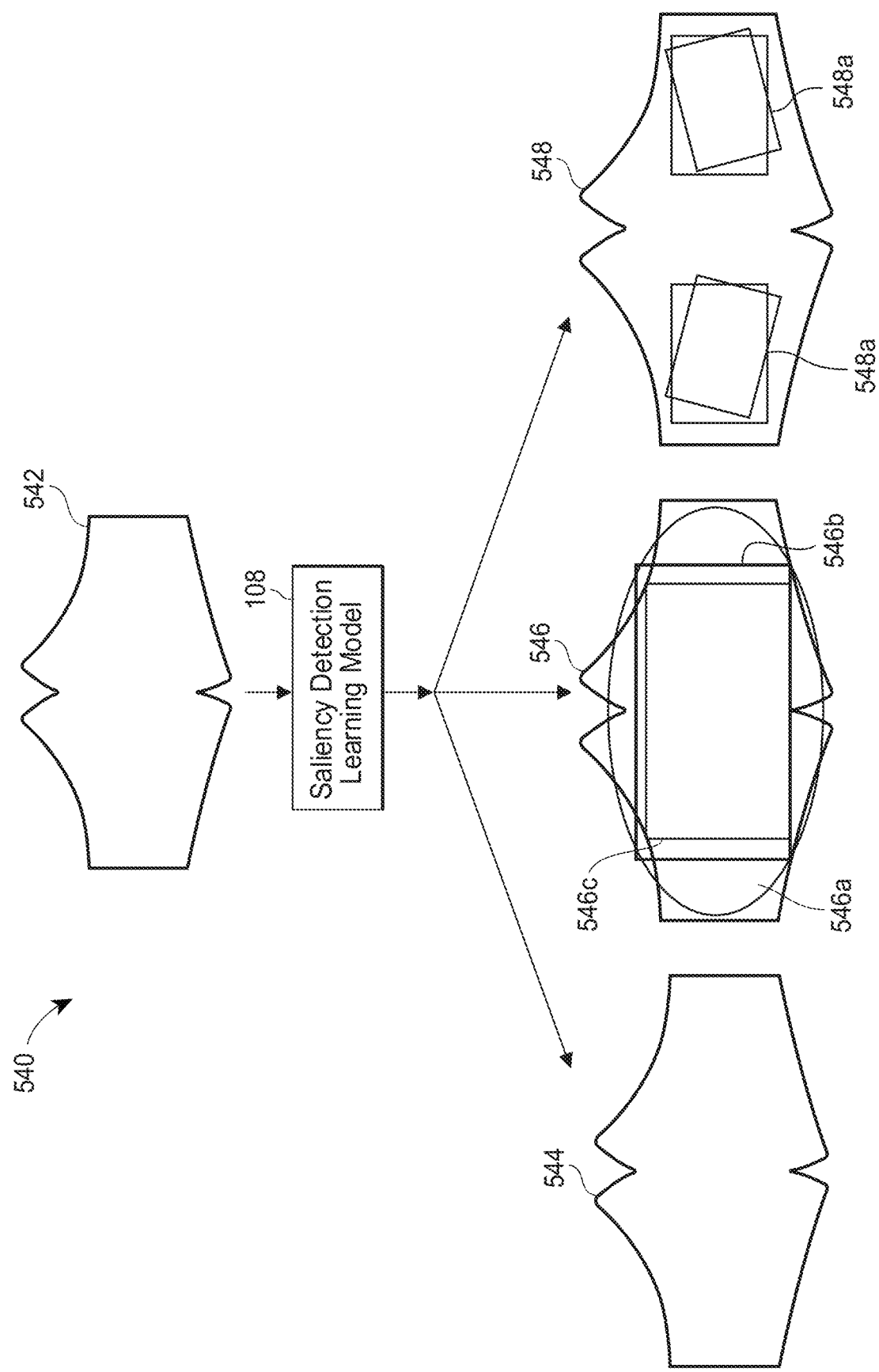

However, in certain circumstances, a user may desire to fit an uploaded image to an irregular shaped object or print area. For example, FIG. 5C illustrates an example saliency fit sequence 540 whereby the saliency detection learning model 108 may determine multiple saliency fit suggestions corresponding to an input image 542 of an irregularly shaped object (e.g., a facemask). In the example saliency fit sequence 540, the saliency detection learning model 108 receives the input image 542, and may generate each of the contour image 544, the inscription image 546, and the mirror rectangle image 548.

For example, the saliency detection learning model 108 may receive the input image 542 as input, and may output the contour image 544 by applying a contour detection algorithm to detect the contour shape of the irregularly shaped object from the input image 542. The contour detection algorithm applied by the saliency detection learning model 108 may output coordinate values (e.g., Cartesian coordinates, polar coordinates, etc.) of pixels within the input image 542 that represent the contour shape. The input image 542 may be a scalable vector graphics (SVG) image, a portable network graphics (PNG) image, a joint photographic experts group (JPEG/JPG) image, a graphics interchange format (GIF) image, and/or any other suitable image type.

As a result, the saliency detection learning model 108 may further utilize the contour image 544 as input to output the inscription image 546. For example, the saliency detection learning model 108 may calculate an ellipse that most closely fits the contour of the irregularly shaped object and determine a largest inscribed rectangle that fits within the ellipse. As illustrated in FIG. 5C, the saliency detection learning model 108 may calculate an ellipse 546a that most closely fits the dimensions of the contour, and may thereafter determine a first inscribed rectangle 546b that fits within the ellipse but exceeds the boundaries of the contour. Because the first inscribed rectangle does not fit entirely within the boundaries of the contour, the saliency detection learning model 108 may determine a second inscribed rectangle 546c that is contained by both the ellipse 546a and the contour of the irregularly shaped object.

The saliency detection learning model 108 may also utilize the inscription image 546 as input to output the mirror rectangle image 548. For example, the saliency detection learning model 108 may receive the inscription image 546 and may apply geometrically-based algorithms to determine side mirror rectangles 548a within the mirror rectangle image 548. Using the slope of the lower edge of the contour (e.g., from the inscription image 546), the saliency detection learning model 108 may rotate the side mirror rectangles 548a, so that any applied graphic designs may be parallel with the lower edge of the irregularly shaped object. Consequently, the saliency detection learning model 108 may detect, crop, and fit salient portions of images/designs to the irregularly shaped object, in accordance with the techniques described herein.

Moreover, when the saliency detection learning model 108 has completed generating areas for saliency fit suggestions on an irregularly shaped object, the model 108 may present these generated areas to a user for the user to peruse and consider. For example, in FIG. 5D, the saliency detection learning model 108 may generate, and the virtual design platform (e.g., virtual design platform 155) may render the example suggested saliency mask prints rendering 560 after the model 108 has generated the areas for saliency fit suggestions described in reference to FIG. 5C. The example suggested saliency mask prints rendering 560 may include a center suggested saliency mask print rendering 562, a first mirrored suggested saliency mask print rendering 564, a filled suggested saliency mask print rendering 566, and a second mirrored suggested saliency mask print rendering 568.

The center suggested saliency mask print rendering 562 may include a salient design or image portion (e.g., an animal head) positioned in the center of the irregularly shaped object. The first mirrored suggested saliency mask print rendering 564 may include a salient design or image portion (e.g., a business logo) mirrored on two sides of the irregularly shaped object. The filled suggested saliency mask print rendering 566 may include a salient design or image portion (e.g., an automobile) filling a majority (or as much as possible) of the irregularly shaped object. The second mirrored suggested saliency mask print rendering 568 may include a salient design or image portion (e.g., a business logo) mirrored on two sides and rotated to be parallel with the bottom edges of the irregularly shaped object. Each type of suggested saliency print may be based on the types of content included in the input image. For example, the saliency detection learning mode 108 may suggest a filled suggested saliency print (e.g., filled suggested saliency mask print rendering 566) if the input image contains patterns or large objects. As another example, the saliency detection learning mode 108 may suggest a mirrored suggested saliency print (e.g., first mirrored suggested saliency mask print rendering 564, second mirrored suggested saliency mask print rendering 568) if the input image contains a logo or other line art.

Although not shown in FIGS. 5A-5D, it should be appreciated that the virtual design platform may, for example in response to a user selection, automatically upload, print, publish, share, or otherwise avail any or all of the formats of the digital designs to corresponding online, retail, or other services. In an implementation, the electronic device may enable the user to select to individually upload, print, publish, share, or otherwise avail any or all of the formats of the digital designs to corresponding online, retail, or other services.

Figure 6:
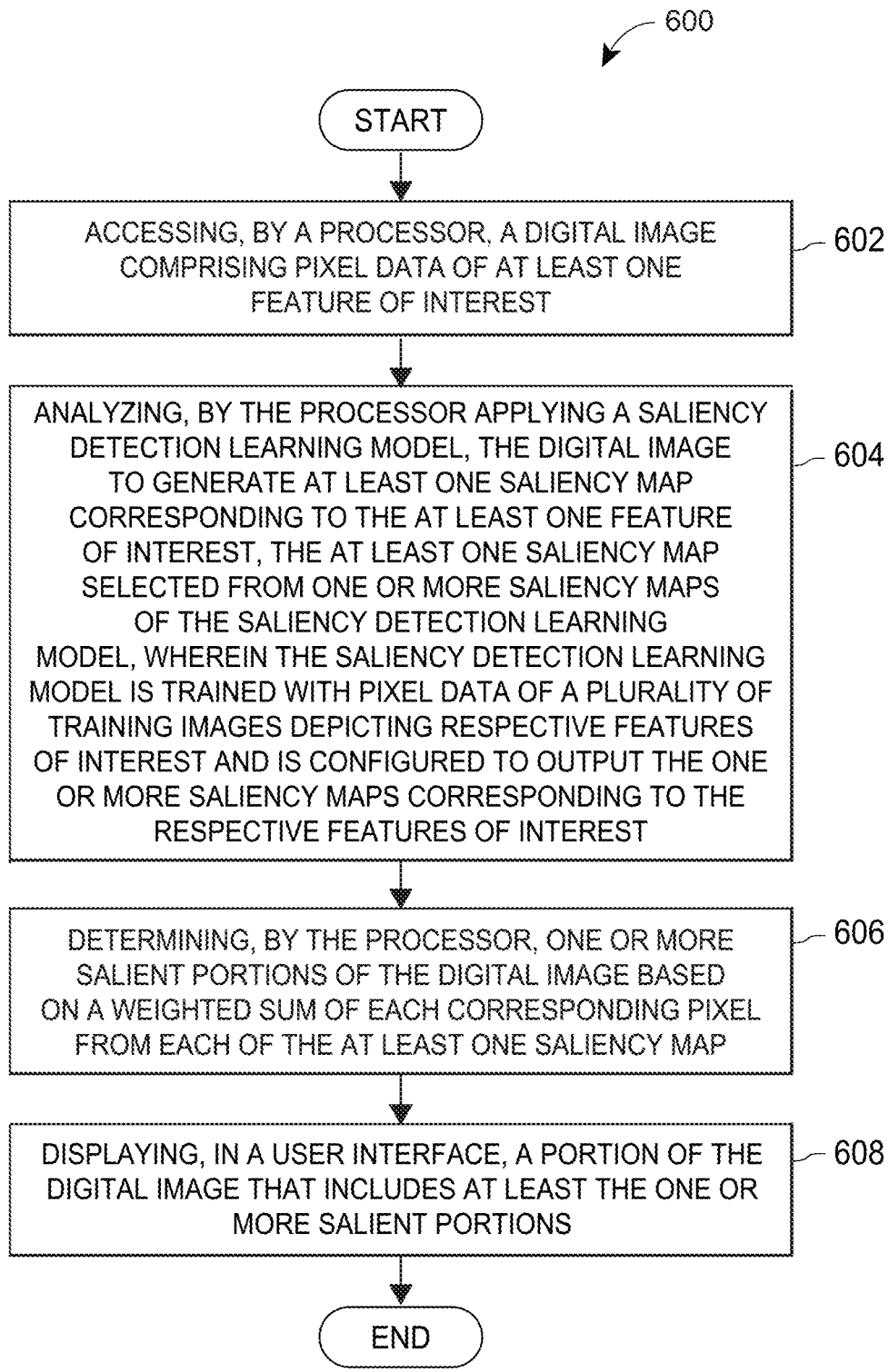
FIG. 6 depicts an example flow diagram associated with automatically determining and displaying salient portions of images, in accordance with some embodiments

FIG. 6 depicts is a block diagram of an example method 600 for automatically determining and displaying salient portions of images. The method 600 may be facilitated by an electronic device (such as any of the devices 103, 104, 105 as depicted in FIG. 1A) that may be in communication with a server(s) (such as the central server 110, as discussed with respect to FIG. 1A). In embodiments, the method 600 may be at least partially facilitated by a remote server, such as the central server 110 as discussed with respect to FIG. 1A. Further, the electronic device may operate or interface with a virtual design platform, such as via a website, application, or the like.

The method 600 may begin when the electronic device accesses (block 602), by a processor, a digital image comprising pixel data of at least one feature of interest. When the processor accesses the digital image, the processor may analyze the digital image (block 604) to generate at least one saliency map corresponding to the at least one feature of interest. The processor may analyze the digital image by applying a saliency detection learning model (e.g., saliency detection learning model 108), which may be trained with pixel data of a plurality of training images depicting respective features of interest and may be configured to output the one or more saliency maps corresponding to the respective features of interest. Moreover, the at least one saliency map may be selected from one or more saliency maps of the saliency detection learning model.

The method 600 may continue when the processor determines (block 606) one or more salient portions of the digital image based on a weighted sum of each corresponding pixel from each of the at least one saliency map. Of course, the processor may determine the salient portion(s) of the digital image based on a weighted sum on an individual pixel basis, an aggregate pixel basis, an average pixel basis, and/or any other suitable evaluation metric or combinations thereof.

In certain aspects, the processor may also determine a salient portion image threshold based on the at least one saliency map to estimate one or more edges present in the at least one saliency map (e.g., as described in reference to FIGS. 3A and 3B). Based on the one or more edges, the processor may further generate a threshold image. Using the threshold image, the processor may detect contours of the one or more salient portions based on the threshold image and may fit a smallest convex polygon for each of the one or more salient portions that contains all points included as part of the contours. The processor may also determine a minimal bounding fit rectangle based on extreme values of each smallest convex polygon, and may combine each minimal bounding fit rectangle to generate a union box.

Further in these aspects, the processor may determine that a union box portion extends beyond a safety line (e.g., as described in reference to FIG. 3C). As a result, the processor may generate a warning signal containing an indication that the union box portion extends beyond the safety line, and display a graphical rendering of the warning signal in the user interface of a user device (e.g., electronic devices 103, 104, 105).

In some aspects, the processor may determine one or more minimal bounding fit rectangle clusters (e.g., as described in reference to FIG. 4A). The processor may calculate a saliency score for each minimal bounding fit rectangle and each of the one or more minimal bounding fit rectangle clusters. Accordingly, the processor may display at least one of the minimal bounding fit rectangles and the one or more minimal bounding fit rectangle clusters based on the respective saliency scores. In certain aspects, the processor may display the at least one of the minimal bounding fit rectangles and the one or more minimal bounding fit rectangle clusters in the user interface in a ranked list based on the respective saliency scores. The ranked list may include a respective minimal bounding fit rectangle or a respective minimal bounding fit rectangle cluster with a highest respective saliency score as a first entry displayed in the user interface. Additionally, the respective saliency scores may be displayed in the user interface with each respective minimal bounding fit rectangle and each respective minimal bounding fit rectangle cluster.

In certain aspects, the processor may generate a graphical rendering of a product by superimposing a first portion of the digital image defined by at least one of the minimal bounding fit rectangles and the one or more minimal bounding fit rectangle clusters with a highest respective saliency score over the product (e.g., as described in reference to FIG. 4B). In these aspects, the processor may display the graphical rendering in the user interface of the user device (e.g., electronic devices 103, 104, 105).

In some aspects, the processor may adjust each minimal bounding fit rectangle and each of the one or more minimal bounding fit rectangle clusters to fit an aspect ratio (e.g., as described in reference to FIG. 5A). The processor may determine a respective padding score corresponding to a respective padding amount added to each respective minimal bounding fit rectangle and each respective minimal bounding fit rectangle cluster during the adjusting (e.g., as described in reference to FIG. 5B). The processor may also compare each respective padding score to a predefined padding threshold, and determine a respective rotation for each respective minimal bounding fit rectangle and each respective minimal bounding fit rectangle cluster when the respective padding score exceeds the predefined padding threshold.

In certain aspects, the processor may generate a graphical rendering of a first portion of the digital image defined by at least one of the minimal bounding fit rectangles and the one or more minimal bounding fit rectangle clusters that is fit to the aspect ratio. The processor may also display the graphical rendering in the user interface of the user device (e.g., electronic devices 103, 104, 105).

Figure 5D:
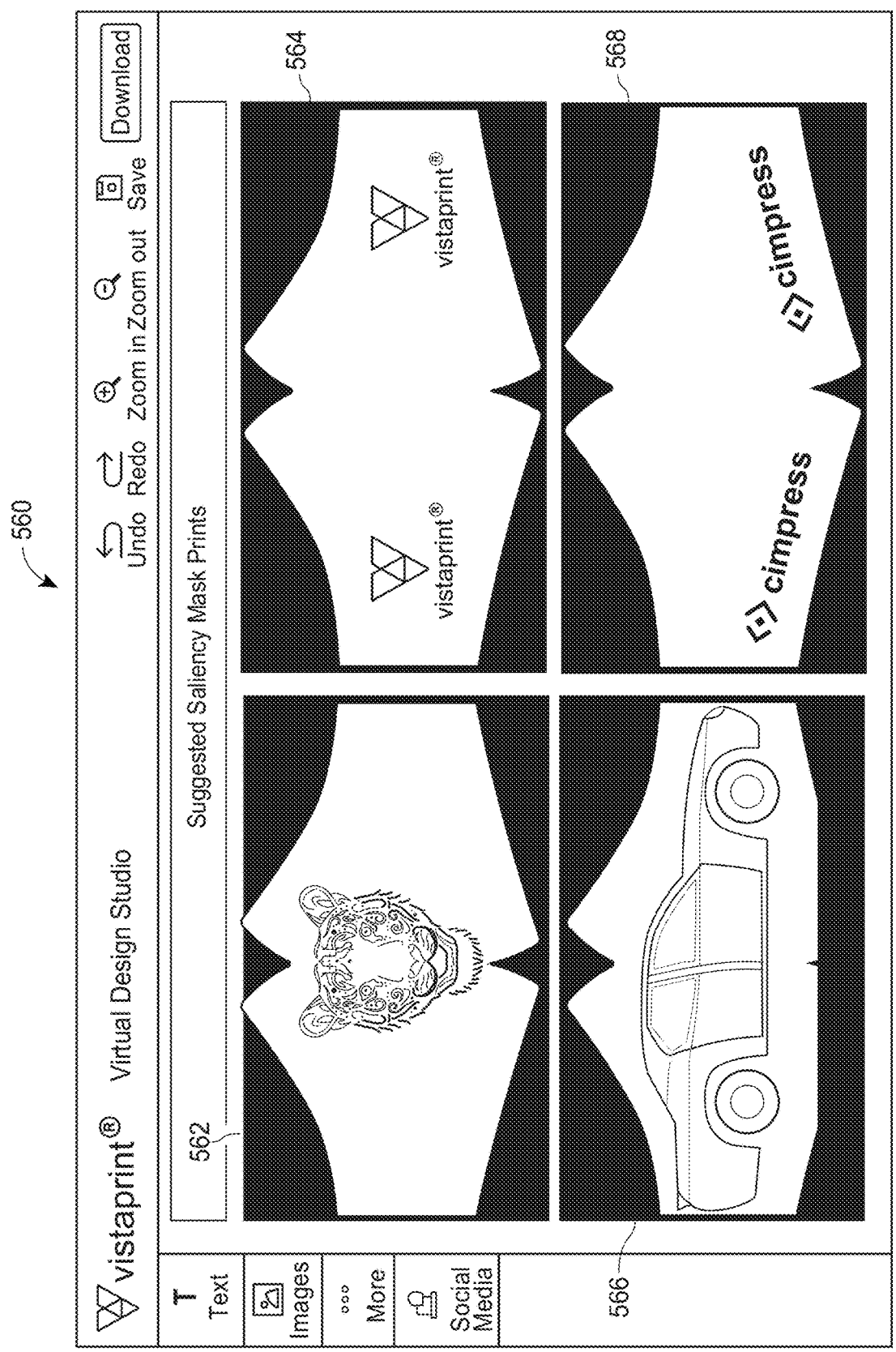

In some aspects, the processor may detect a contour shape of a product (e.g., as described in reference to FIGS. 5C and 5D). The processor may calculate a largest inscribed rectangle and a closest ellipse fit based on the contour shape, and may determine one or more additional areas of interest based on the largest inscribed rectangle and the closest ellipse fit. Further, the processor may fit a first portion of the digital image defined by at least one of the minimal bounding fit rectangles and the one or more minimal bounding fit rectangle clusters to at least one of: (i) the largest inscribed rectangle, (ii) the closest ellipse fit, or (iii) the one or more additional areas of interest based on at least one of (iv) the respective padding amount or (v) the respective rotation.

The method 600 may continue when the processor displays (block 608) a portion of the digital image that includes at least the one or more salient portions in a user interface. In certain aspects, the processor may additionally analyze the digital image to generate a second saliency map corresponding to the at least one feature of interest as selected from the one or more saliency maps of the saliency detection learning model. The processor may analyze the digital image to generate the second saliency map by applying the saliency detection learning model (e.g., saliency detection learning model 108). Further, the one or more salient portions of the digital image may be further based on the weighted sum that includes the second saliency map corresponding to the at least one feature of interest. Of course, it is to be understood that the processor may analyze the digital image by applying the saliency detection learning model to generate any suitable number of saliency maps. For example, the processor may analyze the digital image to generate a second saliency map, a third saliency map, a fourth saliency map, and a fifth saliency map by applying the saliency detection learning model to the digital image.

Figure 7:
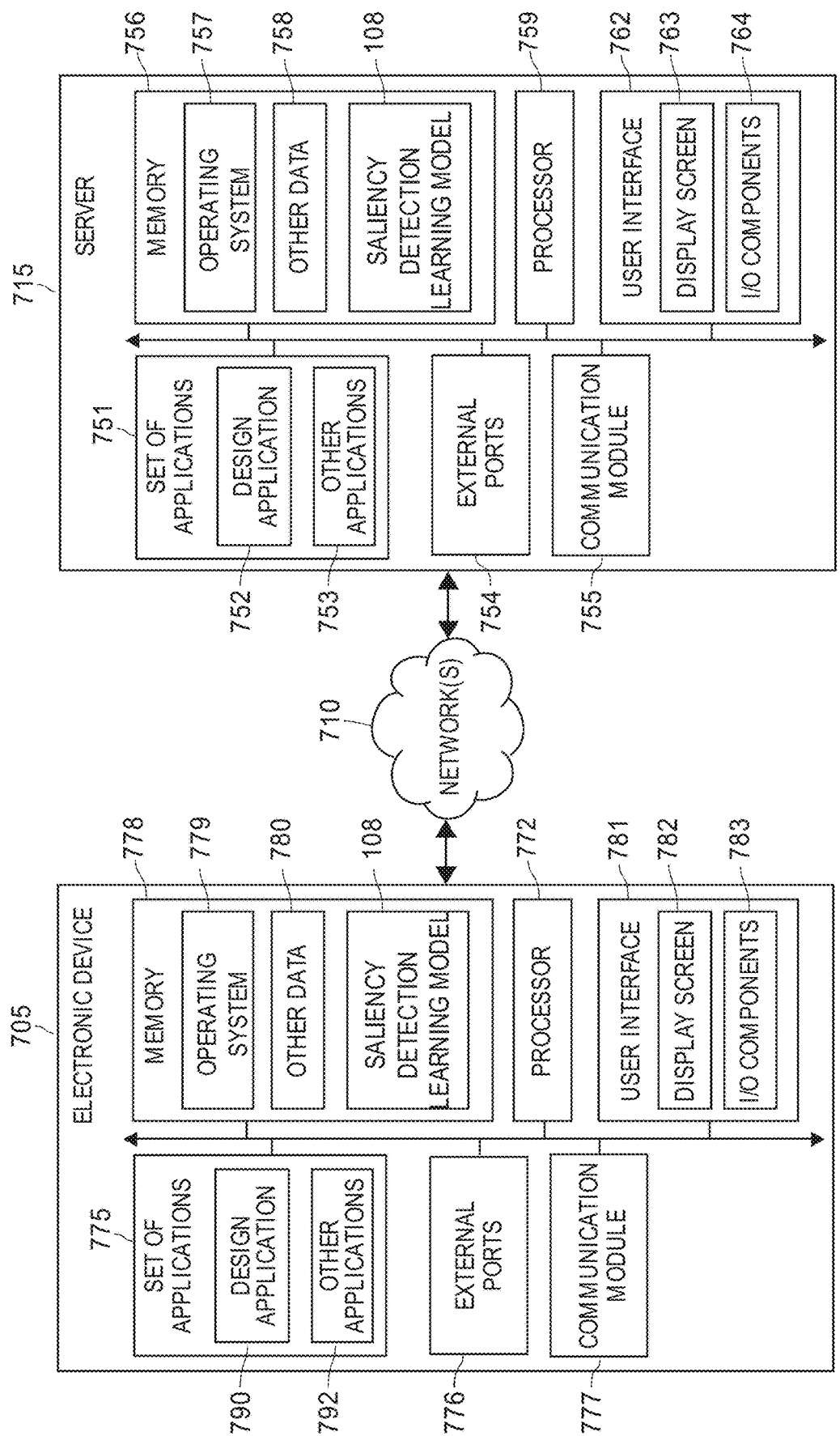
FIG. 7 is a block diagram of an example electronic device and an example server, in accordance with some embodiments.

FIG. 7 illustrates a hardware diagram of an example electronic device 705 (such as one of the electronic devices 103, 104, 105 as discussed with respect to FIG. 1A) and an example server 715 (such as the server computer 110 as discussed with respect to FIG. 1A), in which the functionalities as discussed herein may be implemented.

The electronic device 705 may include a processor 772 as well as a memory 778. The memory 778 may store an operating system 779 capable of facilitating the functionalities as discussed herein as well as a set of applications 775 (i.e., machine readable instructions) and the saliency detection learning model 108. For example, one of the set of applications 775 may be a design application 790 configured to facilitate functionalities associated with automatically determining and displaying salient portions of digital images, as discussed herein. It should be appreciated that one or more other applications 792 are envisioned.

The processor 772 may interface with the memory 778 to execute the operating system 779, the set of applications 775, and the saliency detection learning model 108. According to some embodiments, the memory 778 may also include other data 780 including formatting data. The memory 778 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 705 may further include a communication module 777 configured to communicate data via one or more networks 710. According to some embodiments, the communication module 777 may include one or more transceivers (e.g., WWAN, WLAN, and/or WPAN transceivers) functioning in accordance with IEEE standards, 3GPP standards, or other standards, and configured to receive and transmit data via one or more external ports 776. For example, the communication module 777 may communicate with the server 715 via the network(s) 710.

The electronic device 705 may further include a user interface 781 configured to present information to a user and/or receive inputs from the user. As shown in FIG. 7, the user interface 781 may include a display screen 782 and I/O components 783 (e.g., ports, capacitive or resistive touch sensitive input panels, keys, buttons, lights, LEDs). According to some embodiments, the user may access the electronic device 705 via the user interface 781 to review various salient image portion(s) crop and/or fit suggestions, and make various selections.

In some embodiments, the electronic device 705 may perform the functionalities as discussed herein as part of a "cloud" network or may otherwise communicate with other hardware or software components within the cloud to send, retrieve, or otherwise analyze data.

As illustrated in FIG. 7, the electronic device 705 may communicate and interface with the server 715 via the network(s) 710. The server 715 may include a processor 759 as well as a memory 756. The memory 756 may store an operating system 757 capable of facilitating the functionalities as discussed herein as well as a set of applications 751 (i.e., machine readable instructions) and the saliency detection learning model 108. For example, one of the set of applications 751 may be a design application 752 configured to facilitate functionalities associated with automatically determining and displaying salient portions of digital images, as discussed herein. It should be appreciated that one or more other applications 753 are envisioned.

The processor 759 may interface with the memory 756 to execute the operating system 757, the set of applications 751, and the saliency detection learning model 108. According to some embodiments, the memory 756 may also include other data 758, such data received from the electronic device 705 and/or other data. The memory 756 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The server 715 may further include a communication module 755 configured to communicate data via the one or more networks 710. According to some embodiments, the communication module 755 may include one or more transceivers (e.g., WWAN, WLAN, and/or WPAN transceivers) functioning in accordance with IEEE standards, 3GPP standards, or other standards, and configured to receive and transmit data via one or more external ports 754.

The server 715 may further include a user interface 762 configured to present information to a user and/or receive inputs from the user. As shown in FIG. 7, the user interface 762 may include a display screen 763 and I/O components 764 (e.g., ports, capacitive or resistive touch sensitive input panels, keys, buttons, lights, LEDs). According to some embodiments, the user may access the server 715 via the user interface 762 to review information (e.g., various salient image portion(s) crop and/or fit suggestions), make selections, and/or perform other functions.

In some embodiments, the server 715 may perform the functionalities as discussed herein as part of a "cloud" network or may otherwise communicate with other hardware or software components within the cloud to send, retrieve, or otherwise analyze data. In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 772, 759 (e.g., working in connection with the respective operating systems 779, 757) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A computer-implemented method for automatically determining and displaying salient portions of images, the computer-implemented method comprising:
    accessing, by a processor, a digital image comprising pixel data of at least one feature of interest;
    analyzing, by the processor applying a saliency detection learning model, the digital image to generate at least one saliency map corresponding to the at least one feature of interest, the at least one saliency map selected from one or more saliency maps of the saliency detection learning model, wherein the saliency detection learning model is trained with pixel data of a plurality of training images depicting respective features of interest and is configured to output the one or more saliency maps corresponding to the respective features of interest;
    determining, by the processor, one or more salient portions of the digital image at least by:
        determining a salient portion image threshold based on the at least one saliency map to estimate one or more edges present in the at least one saliency map,
        generating a threshold image based on the one or more edges,
        detecting contours of the one or more salient portions based on the threshold image,
        fitting a smallest convex polygon for each of the one or more salient portions that contains all points included as part of the contours,
        determining a minimal bounding fit rectangle based on extreme values of each smallest convex polygon, and
        combining each minimal bounding fit rectangle to generate a union box; and
    displaying, in a user interface, a portion of the digital image that includes at least the one or more salient portions.

2. The computer-implemented method of claim 1, further comprising:
    analyzing, by the processor applying the saliency detection learning model, the digital image to generate a second saliency map corresponding to the at least one feature of interest as selected from the one or more saliency maps of the saliency detection learning model,
    wherein the one or more salient portions of the digital image are further based on a weighted sum that includes the second saliency map corresponding to the at least one feature of interest.

3. The computer-implemented method of claim 1, further comprising:
    determining, by the processor, that a union box portion extends beyond a safety line;
    generating, by the processor, a warning signal containing an indication that the union box portion extends beyond the safety line; and
    displaying, in the user interface, a graphical rendering of the warning signal.

4. The computer-implemented method of claim 1, further comprising:
    determining, by the processor, one or more minimal bounding fit rectangle clusters;
    calculating, by the processor, a saliency score for each minimal bounding fit rectangle and each of the one or more minimal bounding fit rectangle clusters; and
    displaying, in the user interface, at least one of the minimal bounding fit rectangles and the one or more minimal bounding fit rectangle clusters based on the respective saliency scores.

5. The computer-implemented method of claim 4, wherein the at least one of the minimal bounding fit rectangles and the one or more minimal bounding fit rectangle clusters are displayed in the user interface in a ranked list based on the respective saliency scores,
    wherein the ranked list includes a respective minimal bounding fit rectangle or a respective minimal bounding fit rectangle cluster with a highest respective saliency score as a first entry displayed in the user interface, and
    wherein the respective saliency scores are displayed in the user interface with each respective minimal bounding fit rectangle and each respective minimal bounding fit rectangle cluster.

6. The computer-implemented method of claim 4, further comprising:
    generating, by the processor, a graphical rendering of a product by superimposing a first portion of the digital image defined by at least one of the minimal bounding fit rectangles and the one or more minimal bounding fit rectangle clusters with a highest respective saliency score over the product; and
    displaying, in the user interface, the graphical rendering.

7. The computer-implemented method of claim 4, further comprising:
    adjusting, by the processor, each minimal bounding fit rectangle and each of the one or more minimal bounding fit rectangle clusters to fit an aspect ratio;
    determining, by the processor, a respective padding score corresponding to a respective padding amount added to each respective minimal bounding fit rectangle and each respective minimal bounding fit rectangle cluster during the adjusting;
    comparing, by the processor, each respective padding score to a predefined padding threshold; and
    determining, by the processor, a respective rotation for each respective minimal bounding fit rectangle and each respective minimal bounding fit rectangle cluster when the respective padding score exceeds the predefined padding threshold.

8. The computer-implemented method of claim 7, further comprising:
    generating, by the processor, a graphical rendering of a first portion of the digital image defined by at least one of the minimal bounding fit rectangles and the one or more minimal bounding fit rectangle clusters that is fit to the aspect ratio; and
    displaying, in the user interface, the graphical rendering.

9. The computer-implemented method of claim 7, further comprising:
    detecting, by the processor, a contour shape of a product;
    calculating, by the processor, a largest inscribed rectangle and a closest ellipse fit based on the contour shape;
    determining, by the processor, one or more additional areas of interest based on the largest inscribed rectangle and the closest ellipse fit; and
    fitting, by the processor, a first portion of the digital image defined by at least one of the minimal bounding fit rectangles and the one or more minimal bounding fit rectangle clusters to at least one of: (i) the largest inscribed rectangle, (ii) the closest ellipse fit, or (iii) the one or more additional areas of interest based on at least one of (iv) the respective padding amount or (v) the respective rotation.

10. A system for automatically determining and displaying salient portions of images, comprising:
a user interface;
a memory storing a set of computer-readable instructions comprising at least a saliency detection learning model that is trained with pixel data of a plurality of training images depicting respective features of interest and is configured to output one or more saliency maps corresponding to the respective features of interest; and
a processor interfacing with the user interface and the memory, and configured to execute the set of computer-readable instructions to cause the processor to:
access a digital image comprising pixel data of at least one feature of interest,
analyze, by applying the saliency detection learning model, the digital image to generate at least one saliency map corresponding to the at least one feature of interest, the at least one saliency map selected from the one or more saliency maps of the saliency detection learning model,
determine one or more salient portions of the digital image at least by:
determining a salient portion image threshold based on the at least one saliency map to estimate one or more edges present in the at least one saliency map,
generating a threshold image based on the one or more edges,
detecting contours of the one or more salient portions based on the threshold image,
fit a smallest convex polygon for each of the one or more salient portions that contains all points included as part of the contours,
determine a minimal bounding fit rectangle based on extreme values of each smallest convex polygon, and
combine each minimal bounding fit rectangle to generate a union box; and
cause a user interface to display a portion of the digital image that includes at least the one or more salient portions.

11. The system of claim 10, wherein the set of computer-readable instructions further cause the processor to:
analyze, by applying the saliency detection learning model, the digital image to generate a second saliency map corresponding to the at least one feature of interest as selected from the one or more saliency maps of the saliency detection learning model,
wherein the one or more salient portions of the digital image are further based on a weighted sum that includes the second saliency map corresponding to the at least one feature of interest.

12. The system of claim 10, wherein the set of computer-readable instructions further cause the processor to:
determine that a union box portion extends beyond a safety line;
generate a warning signal containing an indication that the union box portion extends beyond the safety line; and
cause the user interface to display a graphical rendering of the warning signal.

13. The system of claim 10, wherein the set of computer-readable instructions further cause the processor to:
determine one or more minimal bounding fit rectangle clusters;
calculate a saliency score for each minimal bounding fit rectangle and each of the one or more minimal bounding fit rectangle clusters; and
cause the user interface to display at least one of the minimal bounding fit rectangles and the one or more minimal bounding fit rectangle clusters based on the respective saliency scores.

14. The system of claim 13, wherein the at least one of the minimal bounding fit rectangles and the one or more minimal bounding fit rectangle clusters are displayed in the user interface in a ranked list based on the respective saliency scores,
wherein the ranked list includes a respective minimal bounding fit rectangle or a respective minimal bounding fit rectangle cluster with a highest respective saliency score as a first entry displayed in the user interface, and
wherein the respective saliency scores are displayed in the user interface with each respective minimal bounding fit rectangle and each respective minimal bounding fit rectangle cluster.

15. The system of claim 13, wherein the set of computer-readable instructions further cause the processor to:
generate a graphical rendering of a product by superimposing a first portion of the digital image defined by at least one of the minimal bounding fit rectangles and the one or more minimal bounding fit rectangle clusters with a highest respective saliency score over the product; and
cause the user interface to display the graphical rendering.

16. The system of claim 13, wherein the set of computer-readable instructions further cause the processor to:
adjust each minimal bounding fit rectangle and each of the one or more minimal bounding fit rectangle clusters to fit an aspect ratio;
determine a respective padding score corresponding to a respective padding amount added to each respective minimal bounding fit rectangle and each respective minimal bounding fit rectangle cluster during the adjusting;
compare each respective padding score to a predefined padding threshold;
determine a respective rotation for each respective minimal bounding fit rectangle and each respective minimal bounding fit rectangle cluster when the respective padding score exceeds the predefined padding threshold;
generate a graphical rendering of a first portion of the digital image defined by at least one of the minimal bounding fit rectangles and the one or more minimal bounding fit rectangle clusters that is fit to the aspect ratio; and
cause the user interface to display the graphical rendering.

17. The system of claim 16, wherein the set of computer-readable instructions further cause the processor to:
detect a contour shape of a product;
calculate a largest inscribed rectangle and a closest ellipse fit based on the contour shape;
determine one or more additional areas of interest based on the largest inscribed rectangle and the closest ellipse fit; and
fit a first portion of the digital image defined by at least one of the minimal bounding fit rectangles and the one or more minimal bounding fit rectangle clusters to at least one of: (i) the largest inscribed rectangle, (ii) the closest ellipse fit, or (iii) the one or more additional areas of interest based on at least one of (iv) the respective padding amount or (v) the respective rotation.

18. A non-transitory computer-readable storage medium having stored thereon a set of instructions, executable by at least one processor, for automatically determining and displaying salient portions of images, the instructions comprising:

instructions for accessing a digital image comprising pixel data of at least one feature of interest;

instructions for analyzing, by applying a saliency detection learning model, the digital image to generate at least one saliency map corresponding to the at least one feature of interest, the at least one saliency map selected from one or more saliency maps of the saliency detection learning model, wherein the saliency detection learning model is trained with pixel data of a plurality of training images depicting respective features of interest and is configured to output the one or more saliency maps corresponding to the respective features of interest;

instructions for determining one or more salient portions of the digital image at least by:

determining a salient portion image threshold based on the at least one saliency map to estimate one or more edges present in the at least one saliency map, generating a threshold image based on the one or more edges, detecting contours of the one or more salient portions based on the threshold image, fitting a smallest convex polygon for each of the one or more salient portions that contains all points included as part of the contours, determining a minimal bounding fit rectangle based on extreme values of each smallest convex polygon, and combining each minimal bounding fit rectangle to generate a union box; and instructions for displaying, in a user interface, a portion of the digital image that includes at least the one or more salient portions.

* * * * *